(12) United States Patent
Tieftrunk et al.

(10) Patent No.: US 9,473,367 B2
(45) Date of Patent: Oct. 18, 2016

(54) AIRCRAFT MONITORING WITH IMPROVED SITUATIONAL AWARENESS

(71) Applicant: HONEYWELL INTERNATIONAL SARL, Rolle (CH)

(72) Inventors: Petr Tieftrunk, Brno (CZ); Jiri Vasek, Brno (CZ); Petr Frolik, Prague (CZ); David Bajger, Havirov (CZ); Michal Knotek, Brno (CZ); Simon Innocent, Haute-Garonne (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/462,886

(22) Filed: Aug. 19, 2014

(65) Prior Publication Data

US 2016/0057032 A1 Feb. 25, 2016

(51) Int. Cl.
*H04L 12/26* (2006.01)
*G01C 21/00* (2006.01)
*G08G 5/00* (2006.01)

(52) U.S. Cl.
CPC ............ *H04L 43/045* (2013.01); *G01C 21/00* (2013.01); *G08G 5/0013* (2013.01); *G08G 5/0026* (2013.01); *G08G 5/0052* (2013.01); *G08G 5/0082* (2013.01); *G08G 5/0091* (2013.01)

(58) Field of Classification Search
CPC .............................. H04L 43/043; G01C 21/00
USPC ......................................................... 701/533
See application file for complete search history.

(56) References Cited

U.S. PATENT DOCUMENTS 4,812,990 A 3/1989 Adams et al.
4,862,373 A 8/1989 Meng
(Continued)

FOREIGN PATENT DOCUMENTS

EP 2330583 A2 6/2011
WO 0236428 A2 5/2002
WO 2011128835 A2 10/2011

OTHER PUBLICATIONS

Scanlon, C.H.; A Graphical Weather System Design for the NASA Transport Systems Research Vehicle B-737; NASA Technical Memorandum 104205; Feb. 1992.
(Continued)

*Primary Examiner* — Anne Antonucci
(74) *Attorney, Agent, or Firm* — Lorenz & Kopf, LLP

(57) ABSTRACT

Devices, methods and systems are provided for monitoring an aircraft. One exemplary method involves a processing system at a ground location obtaining first information associated with a first region identified by a detection system onboard the aircraft, obtaining second information associated with a second region identified by an external system coupled to the processing system, and displaying a flight tracking image associated with the aircraft that includes a first graphical representation of the first region and a second graphical representation of the second region. The method continues by capturing at least a portion of the flight tracking image displayed on a display device at the ground location and transmitting the captured flight tracking image to the aircraft for subsequent presentation on an onboard display device.

20 Claims, 10 Drawing Sheets

(56) References Cited

U.S. PATENT DOCUMENTS

| | | | |
|---|---|---|---|
| 5,265,024 A | 11/1993 | Crabill et al. | |
| 5,835,059 A | 11/1998 | Nadel et al. | |
| 6,014,606 A | 1/2000 | Tu | |
| 6,289,277 B1 | 9/2001 | Feyereisen et al. | |
| 6,441,773 B1 | 8/2002 | Kelly et al. | |
| 7,027,898 B1 | 4/2006 | Leger et al. | |
| 7,039,505 B1 | 5/2006 | Southard et al. | |
| 7,363,152 B2 | 4/2008 | Sjanic | |
| 8,314,816 B2 * | 11/2012 | Feyereisen | G01C 21/00 342/25 A |
| 8,538,669 B2 | 9/2013 | Agarwal et al. | |
| 8,760,319 B2 * | 6/2014 | Kommuri | G08G 5/0013 340/945 |
| 2002/0039072 A1 | 4/2002 | Gremmert et al. | |
| 2005/0049762 A1 | 3/2005 | Dwyer | |
| 2007/0162197 A1 | 7/2007 | Fleming | |
| 2008/0158049 A1 | 7/2008 | Southard et al. | |
| 2009/0109065 A1 | 4/2009 | Pinheiro | |
| 2010/0198489 A1 | 8/2010 | Rozovski et al. | |
| 2010/0309222 A1 * | 12/2010 | Feyereisen | G01C 21/00 345/629 |
| 2011/0029234 A1 | 2/2011 | Desai et al. | |
| 2011/0257818 A1 | 10/2011 | Ganz et al. | |
| 2013/0080042 A1 | 3/2013 | Estkowski et al. | |
| 2013/0085669 A1 | 4/2013 | Bailey et al. | |
| 2013/0120166 A1 * | 5/2013 | Kommuri | G08G 5/0013 340/971 |

OTHER PUBLICATIONS

EP Search Report, EP 12191887.4-1803/2595136 dated Jan. 30, 2014.
EP Exam Report, EP 12191887.4 dated Feb. 13, 2014.
USPTO Office Action for U.S. Appl. No. 13/296,943 dated Aug. 22, 2013.
USPTO Office Action for U.S. Appl. No. 13/296,943 dated Dec. 11, 2013.
Notice of Allowance for U.S. Appl. No. 13/296,943 dated Feb. 13, 2014.
Supplemental Notice of Allowance for U.S. Appl. No. 13/296,943 dated Apr. 29, 2014.
Supplemental Notice of Allowance for U.S. Appl. No. 13/296,943 dated Apr. 30, 2014.
EP Examination Report for Application No. 12191887.4 dated Dec. 19, 2014.
Kommuri, S. et al.; Aircraft Monitoring With Improved Situational Awareness, U.S. Appl. No. 14/283,441, filed May 21, 2014.
EP Examination Report for Application No. 12191887.4 dated Jul. 22, 2015.
USPTO Final Office Action, Notification Date Mar. 18, 2016; for U.S. Appl. No. 14/283,441.
USPTO Office Action for U.S. Appl. No. 14/283,441; Notification date Nov. 23, 2015.
Extended EP search report for Application No. 15180314.5-1803/2988286 dated Jan. 27, 2016.
USPTO Office Action, Notification Date Jul. 6, 2016; for U.S. Appl. No. 14/283,441.

* cited by examiner

AIRCRAFT MONITORING WITH IMPROVED SITUATIONAL AWARENESS

TECHNICAL FIELD

The subject matter described herein relates generally to avionics systems, and more particularly, embodiments of the subject matter relate to providing flight tracking images to aircraft for improved situational awareness.

BACKGROUND

Airlines and other aircraft operators utilize various personnel on the ground to monitor and provide weather, air traffic, and other relevant information to pilots that supplements the information provided to pilots via air traffic control, automatic terminal information service (ATIS), onboard instrumentation, and the like. For example, ground personnel may track the flight of an aircraft while concurrently monitoring weather (e.g., using Doppler radar or the like), and notify the pilot of the aircraft prior to the aircraft encountering an impending weather hazard. Traditionally, in this situation, the ground personnel may communicate a data link message to the pilot that describes the upcoming weather or suggests an alternative route (e.g., a different flight path, flight level, destination, or the like) to avoid the weather. However, the pilot is often deprived of the ability to independently analyze the information being relied on by the ground personnel, and therefore, lacks situational awareness when determining how to proceed with operating the aircraft.

BRIEF SUMMARY

Devices, systems and methods are provided for monitoring an aircraft. One exemplary method involves a processing system at a ground location obtaining first information associated with a first region identified by a detection system onboard the aircraft, obtaining second information associated with a second region identified by an external system communicatively coupled to the processing system, and displaying a flight tracking image associated with the aircraft that includes a first graphical representation of the first region and a second graphical representation of the second region. The method continues by capturing at least a portion of the flight tracking image displayed on the display device, resulting in a captured flight tracking image including the first graphical representation of the first region and the second graphical representation of the second region, and communicating the captured flight tracking image to the aircraft.

In one embodiment, an exemplary flight tracking station includes a communications system coupled to a communications network to receive first information associated with a first region identified by a detection system onboard an aircraft, a display device having a map associated with the aircraft presented thereon, and a processing system coupled to the communications system and the display device. The processing system displays a first graphical representation of the first region on the map, obtains second information associated with a second region identified by a monitoring system coupled to the processing system, displays a second graphical representation of the second region on the map, and captures at least a portion of the map. The capturing results in a captured flight tracking image including the first graphical representation of the first region and the second graphical representation of the second region, wherein the processing system and the communications system are cooperatively configured to transmit the captured flight tracking image to the aircraft via the communications network.

In yet another embodiment, an exemplary system onboard an aircraft comprises a display device, a detection system to provide first information indicative of a detected region in a vicinity of the aircraft, a communications system coupled to a communications network, and a processing system. The processing system is coupled to the communications system, the display device, and the detection system. The processing system communicates the first information to a flight tracking station via the communications network, receives a captured flight tracking image from the flight tracking station via the communications network, and displays the captured flight tracking image on the display device. The captured flight tracking image includes a first graphical representation of the detected region and a second graphical representation of a second region identified by a monitoring system communicatively coupled to the flight tracking station.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
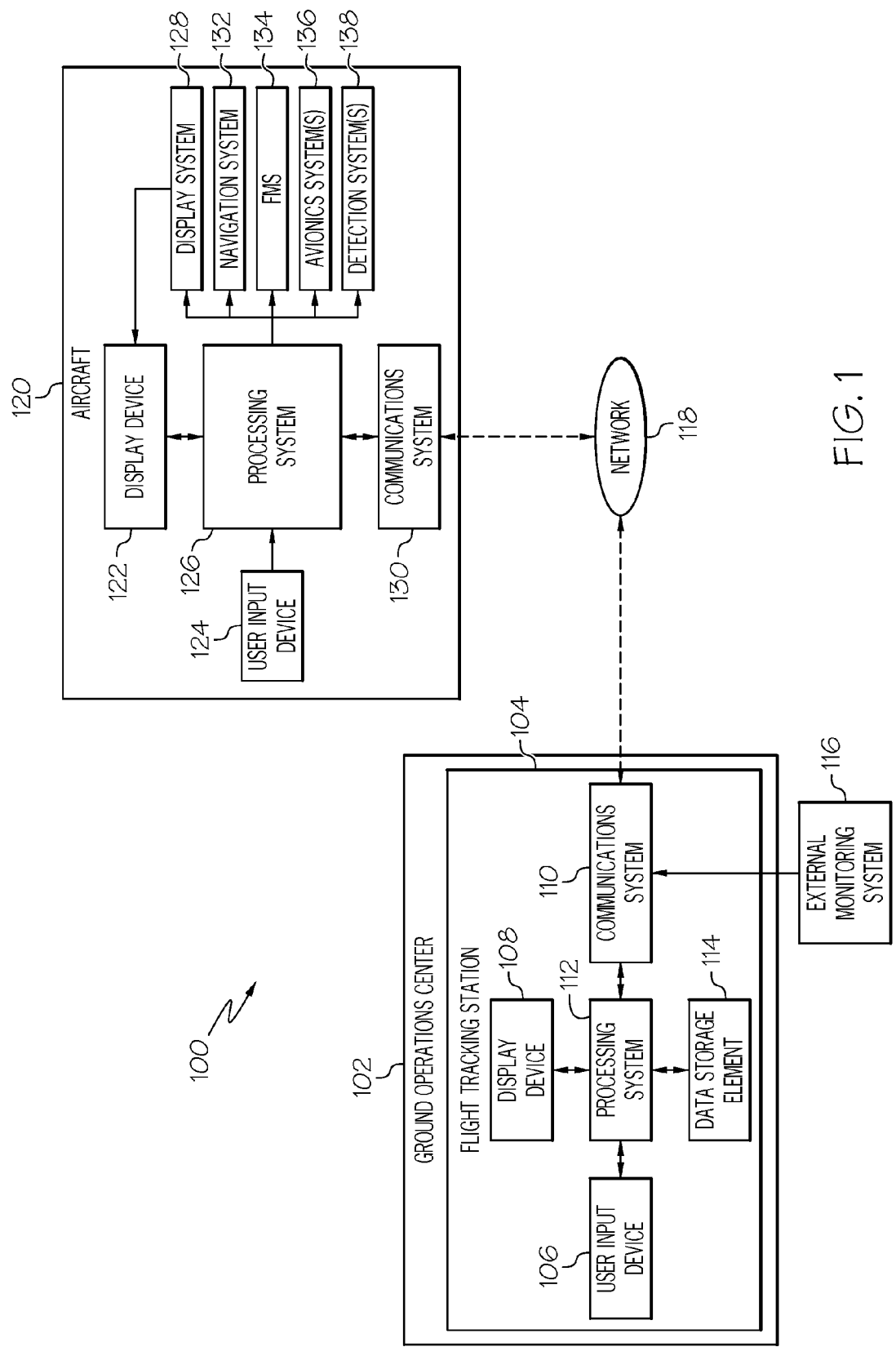
FIG. 1 is a block diagram of a flight tracking system in an exemplary embodiment.

Embodiments of the subject matter described herein relate to systems and methods for generating flight tracking images by fusing, integrating, or otherwise combining information from a variety of sources into a single flight tracking image and capturing the flight tracking image for subsequent transmission to an aircraft for presentation on a display device onboard the aircraft. In exemplary embodiments, information obtained from one or more detection systems onboard the aircraft are communicated to a flight tracking station at a ground location for presenting corresponding graphical representations on a flight tracking map associated with the aircraft. Additionally, flight tracking station presents, on the flight tracking map, one or more graphical representations of information obtained from external sources of meteorological and/or aviation-related information that is not available to the pilot and/or co-pilot of the aircraft using onboard instrumentation, such as, for example, Doppler radar weather systems. In this manner, imagery corresponding to region(s) of interest detected by the aircraft onboard system(s) is presented currently with imagery corresponding to region(s) of interest detected by the external system(s) on the flight tracking map associated with the aircraft, thereby providing a more complete representation of the current operational situation to a user at the ground location, such as a flight dispatcher or air traffic controller.

A user at the ground location may manipulate or otherwise interact with the flight tracking map to propose modifications to the aircraft's flight plan and/or add annotations to the flight tracking map before capturing the flight tracking map and communicating the captured flight tracking map along with the modifications and/or annotations to the aircraft. Thus, the captured flight tracking map includes the combined imagery from the various sources of information along with the modifications and/or annotations made by the user at the ground location. Thus, the pilot's situational awareness with respect to the upcoming operation of the aircraft and the motivation or rationale underlying any modification(s) proposed by the ground personnel is improved. The captured flight tracking map presented onboard the aircraft represents the same flight tracking map that was viewed by the ground personnel at the instant when he or she initiated the capturing after making the modification(s) and/or annotation(s). Accordingly, the onboard display may be effectively synchronized with the display on the ground, thereby improving the efficiency of communications between the pilot and the ground personnel, which, in turn, facilitates safer and/or more efficient operations of the aircraft. In some embodiments, the captured flight tracking map may be cropped, zoomed, or otherwise scaled by the ground personnel to focus on a particular portion, which is then transmitted to the aircraft such that the captured flight tracking map is presented on the aircraft with the same amount of cropping, zooming, and/or other type of scaling. Thus, not only may the content of the onboard display with the display on the ground be synchronized, but the display settings of the onboard display with the display on the ground may also be synchronized, which further improves the pilot's ability to understand the communications received from the ground personnel.

FIG. 1 depicts an exemplary embodiment of a flight tracking system 100 for an aircraft 120. The illustrated system 100 includes a flight tracking station 104 at a ground operations center 102 that communicates with the aircraft 120 to provide flight tracking images and related information to the aircraft 120 for graphical presentation to a pilot, co-pilot, or other onboard personnel on a display device 122 onboard the aircraft 120, as described in greater detail below in the context of FIGS. 2-8.

In the illustrated embodiment of FIG. 1, the ground operations center 102 generally represents a facility located on the ground that includes one or more flight tracking stations 104 equipped to track, analyze, and otherwise monitor operations of one or more aircraft 120. In this regard, the flight tracking station 104 generally represents a computer or other computing system at the ground operations center 102 that may be operated by ground personnel, such as a flight dispatcher or air traffic controller, to monitor and track the flight of the aircraft 120. In an exemplary embodiment, the flight tracking station 104 includes a user input device 106, a display device 108, a communications system 110, a processing system 112, and a data storage element 114. In exemplary embodiments, the display device 108 is realized as an electronic display coupled to the processing system 112 that is capable of graphically displaying a flight tracking display that includes information or other data associated with operation of the aircraft 120 under control of the processing system 112, as described in greater detail below. The user input device 106 is coupled to the processing system 112, and the user input device 106 and the processing system 112 are cooperatively configured to allow ground personnel monitoring aircraft 120 to interact with the flight tracking station 104 to capture the flight tracking display on the display device 108 and communicate captured flight tracking images to the aircraft 120, as described in greater detail below. Depending on the embodiment, the user input device 106 may be realized as a keypad, touchpad, keyboard, mouse, touch panel (or touchscreen), joystick, knob, line select key or another suitable device adapted to receive input from a user, such as an audio input device, such as a microphone, audio transducer, audio sensor, or the like.

The communications system 110 generally represents the combination of hardware, firmware and/or other components configured to support communications between the flight tracking station 104 and the aircraft 120. In exemplary embodiments, the communications system 110 includes an interface for communicatively coupling the flight tracking station 104 to a communications network 118, such as the Internet, a satellite network, a cellular network, or the like, that supports unicast or point-to-point communications to/from the aircraft 120. In some embodiments, the communications system 110 may also include hardware and/or other components configured to support data link communications to/from the aircraft 120 using a data link infrastructure and/or a data link service provider.

The illustrated communications system 110 also includes hardware, firmware and/or a combination thereof adapted to receive communications from one or more external monitoring system(s) 116, such as, for example, one or more external weather monitoring systems and/or one or more aviation monitoring systems. The external monitoring system(s) 116 may not be coupled to the network 118 and/or the information from the external monitoring system(s) 116 may not be available via the network 118. In some embodiments, the information from the external monitoring system(s) 116 may not be formatted or parameterized for transmission to and/or receipt by the processing system 126 or for processing and/or presentation by the processing system 126. In other embodiments, the information from the external monitoring system(s) 116 may not be available at or within the current geographic location (or area) for the aircraft 120, or the information from the external monitoring system(s) 116 may not be available for the current geographic location (or area) for the aircraft 120.

Depending on the embodiment, one or more external weather monitoring system(s) 116 may include or otherwise be realized as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. In this regard, the external weather monitoring system(s) 116 may provide weather information and/or data that is more comprehensive and/or robust than what the equipment onboard the aircraft 120 is capable of measuring or otherwise obtaining, or weather information and/or data that is otherwise unavailable using the equipment onboard the aircraft 120. In this regard, the weather information provided by an external weather monitoring system 116 may include forecast weather information that is generated based on historical trends and/or other weather observations, and may include weather information for geographical areas that are beyond the range of any weather detection systems 140 onboard the aircraft 120. For example, a weather detection system 138 onboard the aircraft 120 (e.g., onboard weather radar) may provide real-time weather information for regions within a limited distance (e.g., typically 320 nautical miles or less) due to the curvature of the Earth's surface and/or the current aircraft heading or orientation, while an external weather monitoring system 116 may provide current and/or forecast weather information for a relatively large geographic area (e.g., across an entire continent) that encompasses an extended portion of the aircraft's projected flight plan. The information from the external weather monitoring system 116 may be updated or refreshed at a lower frequency than which the information from the onboard detection system 138 is updated, such that the information from the external weather monitoring system 116 may have a lower accuracy, precision or other quality metric associated therewith relative to the information from the onboard detection system 138. In practice, the information from the external weather monitoring system 116 may be operationally used to obtain a "big picture" strategic view of the current weather phenomena and trends in its changes in intensity and/or movement.

Similarly, in some embodiments, one or more external aviation monitoring system(s) 116 may include or otherwise be realized as SIGMET reporting system (or data feed), NOTAM reporting system (or data feed), PIREP reporting system (or data feed), an aircraft report (AIREP) reporting system (or data feed), an airmen's meteorological information (AIRMET) reporting system (or data feed), a METAR monitoring system, an aircraft situation display to industry (ASDI) reporting system (or data feed), a central flow management unit (CMFU), an automatic dependent surveillance-broadcast (ADS-B) system, an airport delay reporting system (or data feed), or the like, that is capable of providing information and/or data pertaining to the air traffic and/or congestion, SIGMET advisories, AIRMET advisories, NOTAMs, PIREPs, AIREPs, METAR information, airport delays, airspace flow program (AFP) delays, ocean tracks, flow constrained areas (FEAs), flow evaluation areas (FEAs), terminal aerodrome forecasts (TAFs), runway visual ranges (RVRs), diversion summaries, volcanic ash, and the like. Again, the external aviation monitoring system(s) 116 may provide aviation-related information and/or data that is more comprehensive and/or robust than what is available onboard the aircraft 120, or aviation-related information and/or data that is otherwise unavailable using the equipment onboard the aircraft 120.

In an exemplary embodiment, the processing system 112 generally represents the hardware, circuitry, processing logic, and/or other components configured to receive or otherwise obtain weather and/or other aviation related information from one or more external monitoring systems 116 (e.g., via communications system 110), receive information pertaining to the current position (or location) of the aircraft 120 (e.g., via communications systems 110, 130), render or otherwise display flight tracking images on the display device 108, and perform additional processes, tasks and/or functions to support operation of the flight tracking system 100, as described in greater detail below. Depending on the embodiment, the processing system 112 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

In practice, the processing system 112 includes processing logic that may be configured to carry out the functions, techniques, and processing tasks associated with the operation of the flight tracking system 100 described in greater detail below. Furthermore, the steps of a method or algorithm described in connection with the embodiments disclosed herein may be embodied directly in hardware, in firmware, in a software module executed by the processing system 112, or in any practical combination thereof In accordance with one or more embodiments, the processing system 112 includes or otherwise accesses a computer-readable medium, such as a memory, data storage element, or another suitable non-transitory short or long term storage media, which is capable of storing computer-executable programming instructions or other data for execution that, when read and executed by the processing system 112, cause the processing system 112 to execute and perform one or more of the processes tasks, operations, and/or functions described herein.

As described in greater detail below, in an exemplary embodiment, the processing system 112 includes or otherwise accesses a data storage element 114 that supports rendering and/or display of a flight tracking map on the display device 108 that includes a graphical representation of the aircraft 120 overlying a graphical representation of the terrain in the vicinity of the aircraft 120, wherein the aircraft graphic is positioned over the terrain background in a manner that accurately reflects the current (e.g., instantaneous or substantially real-time) real-world positioning of the aircraft 120 relative to the earth. The data storage element 114 may be realized as a terrain database, an obstacle database, a navigational database, a geopolitical database, a terminal airspace database, a special use airspace database, or a combination thereof In this regard, in addition to the graphical representation of terrain, the flight tracking map displayed on the display device 108 may include graphical representations of navigational reference points (e.g., waypoints, navigational aids, distance measuring equipment (DMEs), very high frequency omnidirectional radio ranges (VORs), and the like), designated special use airspaces, obstacles, and the like which are in the vicinity of the aircraft 120 overlying the terrain on the flight tracking map. In an exemplary embodiment, the data storage element 114 also stores or otherwise maintains information pertaining to the scheduled flight plan (or flight path) for the aircraft 120, so that the processing system 112 may render or otherwise display the projected flight path for the aircraft 120 on the flight tracking map.

As described in greater detail below in the context of FIGS. 2-8, the processing system 112 also renders or otherwise displays graphical representations of the meteorological and/or other aviation-related information received from external monitoring systems 116 on or overlying the flight tracking map. In this manner, the flight tracking map displayed on the display device 108 may also include graphical representations of regions of precipitation, turbulence, convection, winds, icing, air traffic, and the like overlying the terrain background. Additionally, the processing system 112 also renders or otherwise displays graphical representations of the meteorological and/or other aviation-related information received from the detection system(s) 138 onboard the aircraft 120 overlying the flight tracking map. In this manner, the flight tracking map displayed on the display device 108 may integrate or otherwise combine graphical representations of regions of interest (e.g., precipitation, turbulence, convection, winds, icing, air traffic, and the like) identified based on information from the external monitoring systems 116 with graphical representations of regions of interest identified based on information from the onboard detection system(s) 138 overlying the terrain background and/or the projected flight path (or route) for the aircraft 120.

In an exemplary embodiment, during operation of the flight tracking system 100, when the meteorological and/or other aviation-related information received from the external monitoring system(s) 116 and/or the onboard detection system(s) 138 appears likely to impact upcoming operation of the aircraft 120, the ground personnel at the flight tracking station 104 manipulates the user input device 106 to capture a flight tracking image. The captured flight tracking image corresponds to the currently displayed state of the flight tracking map at the time (or instant) of capture. Before or after the capture, the ground personnel at the flight tracking station 104 may also manipulate the user input device 106 to input or otherwise provide proposed modifications to the flight plan, annotations, textual messages and/or other explanatory information associated with the captured flight tracking image for communication to the aircraft 120 for presentation in conjunction with the captured flight tracking image. For example, as described in greater detail below, in accordance with one exemplary embodiment, the ground personnel at the flight tracking station 104 manipulates the user input device 106 to modify one or more navigational reference points of the flight plan displayed on the flight tracking map to create modified flight plan that avoids one or more regions identified by one of the external monitoring system(s) 116 and/or the onboard detection system(s) 138 that may interfere with upcoming operation of the aircraft 120 (e.g., regions of high turbulence, convection, precipitation, air traffic, or the like), and capture a flight tracking image that includes a graphical representation of the projected flight path of the modified flight plan along with the graphical representations of the information identified by and/or received from the external monitoring system(s) 116 and the onboard detection system(s) 138.

Presenting the captured flight tracking image on the onboard display device 122 allows the pilot of the aircraft 120 to concurrently view, on the display device 122, one or more of the following: the projected flight path for the original flight plan, the projected flight path for the modified flight plan provided by the ground personnel, the graphical representation(s) of the information obtained from the external monitoring system(s) 116 and/or the onboard detection system(s) 138 that motivated the modified flight plan, the relationship of the current location of the aircraft 120 with respect to the projected flight paths and/or the potentially interfering regions identified by the external monitoring system(s) 116 and/or the onboard detection system(s) 138, and/or any annotations, textual messages and/or other information provided by the ground personnel at the flight tracking station 104 that explains the modified flight plan and/or the potentially interfering regions identified by external monitoring system(s) 116 and/or the onboard detection system(s) 138. As a result, the pilot's situational awareness is improved when making a determination as to how to continue operating the aircraft 120 based on the captured flight tracking image presented on the onboard display device 122.

Still referring to FIG. 1, in an exemplary embodiment, the aircraft 120 includes, without limitation, a display device 122, a user input device 124, a processing system 126, a display system 128, a communications system 130, a navigation system 132, a flight management system (FMS) 134, one or more avionics systems 136, and one or more detection systems 138. The display device 122 is an electronic display capable of graphically displaying flight information or other data associated with operation of the aircraft 120 under control of the display system 128 and/or processing system 126. In this regard, the display device 122 is coupled to the display system 128 and the processing system 126, wherein the processing system 126 and the display system 128 are cooperatively configured to display, render, or otherwise convey one or more graphical representations or images associated with operation of the aircraft 120 on the display device 122.

The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120. Depending on the embodiment, the user input device 124 may be realized as a keypad, touchpad, keyboard, mouse, touch panel (or touchscreen), joystick, knob, line select key or another suitable device adapted to receive input from a user, such as a microphone, audio transducer, audio sensor, or another audio input device.

The processing system 126 generally represents the hardware, circuitry, processing logic, and/or other components configured to facilitate communications and/or interaction with the flight tracking station 104 (e.g., via communications system 130 and network 118) to transmit or otherwise provide information obtained by one of more onboard systems 132, 134, 136, 138 to the flight tracking station 104, receive uplinked images for presentation on the display device 122, and perform additional processes, tasks and/or functions to support operation of the flight tracking system 100, as described in greater detail below. Depending on the embodiment, the processing system 126 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 126 includes processing logic that may be configured to carry out the functions, techniques, and processing tasks associated with the operation of the flight tracking system 100 described in greater detail below. Furthermore, the steps of a method or algorithm described in connection with the embodiments disclosed herein may be embodied directly in hardware, in firmware, in a software module executed by the processing system 126, or in any practical combination thereof In accordance with one or more embodiments, the processing system 126 includes or otherwise accesses a computer-readable medium, such as a memory or another suitable non-transitory short or long term storage media, which is capable of storing computer-executable programming instructions or other data for execution that, when read and executed by the processing system 126, cause the processing system 126 to execute and perform one or more of the processes tasks, operations, and/or functions described herein. In some embodiments, the display device 122, the user input device 124, and/or the processing system 126 may be implemented as an electronic flight bag that is separate from the aircraft 120 but capable of being communicatively coupled to the other elements of the aircraft 120 when onboard the aircraft 120.

The display system 128 generally represents the hardware, firmware, and/or other components configured to control the display and/or rendering of one or more displays pertaining to operation of the aircraft 120 and/or systems 130, 132, 134, 136, 138 on the display device 122 (e.g., synthetic vision displays, navigational maps, and the like). In this regard, the display system 128 may access or include one or more databases suitably configured to support operations of the display system 128, such as, for example, a terrain database, an obstacle database, a navigational database, a geopolitical database, a terminal airspace database, a special use airspace database, or other information for rendering and/or displaying content on the display device 122.

Still referring to FIG. 1, in an exemplary embodiment, the navigation system 132 provides real-time navigational data and/or information regarding operation of the aircraft 120 to the processing system 126 and/or display system 128 to support rendering the display(s) on the display device 122. The navigation system 132 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 132, as will be appreciated in the art. The navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

In the illustrated embodiment, the processing system 126 is coupled to the communications system 130, which is configured to support communications to and/or from the aircraft 120 via the network 118. In this regard, the communications system 130 includes an interface for communicatively coupling the aircraft 120 and/or processing system 126 to the communications network 118 that supports utilizing unicast or point-to-point communications to/from the aircraft 120 via the network 118. In some embodiments, the communications system 110 may also include a data link system or another suitable radio communication system that supports communications between the aircraft 120 and the flight tracking station 104. Additionally, the communications system 130 may also support communications between the aircraft 120 and air traffic control or another command center or ground location. The processing system 126 is also coupled to the FMS 134, which is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120 to the processing system 126.

In exemplary embodiments, the onboard detection system(s) 138 are coupled to the processing system 126 and/or the display system 128 to generate or otherwise provide information indicative of various objects or regions of interest within the vicinity of the aircraft 120 that are sensed, detected, or otherwise identified by a respective onboard detection system 138. In one or more embodiments, an onboard detection system 138 is realized as a weather radar system or other weather sensing system that measures, senses, or otherwise detects meteorological regions or other weather conditions in the vicinity of the aircraft 120 and provides corresponding radar data (e.g., radar imaging data, range setting data, angle setting data, and/or the like) to one or more of the other onboard systems 126, 128, 130, 132, 134, 136 for further processing and/or handling. For example, the processing system 126 and/or the display system 128 may generate or otherwise provide graphical representations of the meteorological regions identified by the onboard detection system 138 on the display device 122 (e.g., on or overlying a lateral map display). In another embodiment, an onboard detection system 138 may be realized as a collision avoidance system that measures, senses, or otherwise detects air traffic, obstacles, terrain and/or the like in the vicinity of the aircraft 120 and provides corresponding detection data to one or more of the other onboard systems 126, 128, 130, 132, 134, 136.

It should be understood that FIG. 1 is a simplified representation of the flight tracking system 100 for purposes of explanation and ease of description, and FIG. 1 is not intended to limit the application or scope of the subject matter described herein in any way. Practical embodiments of the flight tracking system 100 and/or aircraft 120 will include numerous other devices and components for providing additional functions and features, as will be appreciated in the art. In this regard, it should be appreciated that any number of different onboard detection systems 138 may be provided on the aircraft 120 in practical embodiments. That said, for clarify and ease of explanation, the subject matter may be described herein in the context of an onboard weather detection system (e.g., weather radar), however, the subject matter described herein is not limited to weather and may be implemented in an equivalent manner to suit any particular type of detection system onboard the aircraft 120.

Additionally, in practice, the aircraft 120 will likely include numerous avionics systems not illustrated in FIG. 1 for obtaining and/or providing real-time flight-related information that may be displayed on the display device 122 or otherwise provided to a user (e.g., a pilot, a co-pilot, or crew member). For example, practical embodiments of the aircraft 120 will likely include one or more of the following avionics systems suitably configured to support operation of the aircraft 120: an air traffic management system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Additionally, although FIG. 1 shows a single display device 122, in practice, additional display devices may be present onboard the aircraft 120. Lastly, it should be noted that in other embodiments, features and/or functionality of processing system 126 described herein can be implemented by or otherwise integrated with the features and/or functionality provided by the display system 128 or the FMS 134. In other words, some embodiments may integrate the processing system 126 with the display system 128 or the FMS 134, that is, the processing system 126 described herein may be a component of the display system 128 and/or the FMS 134.

Figure 2:
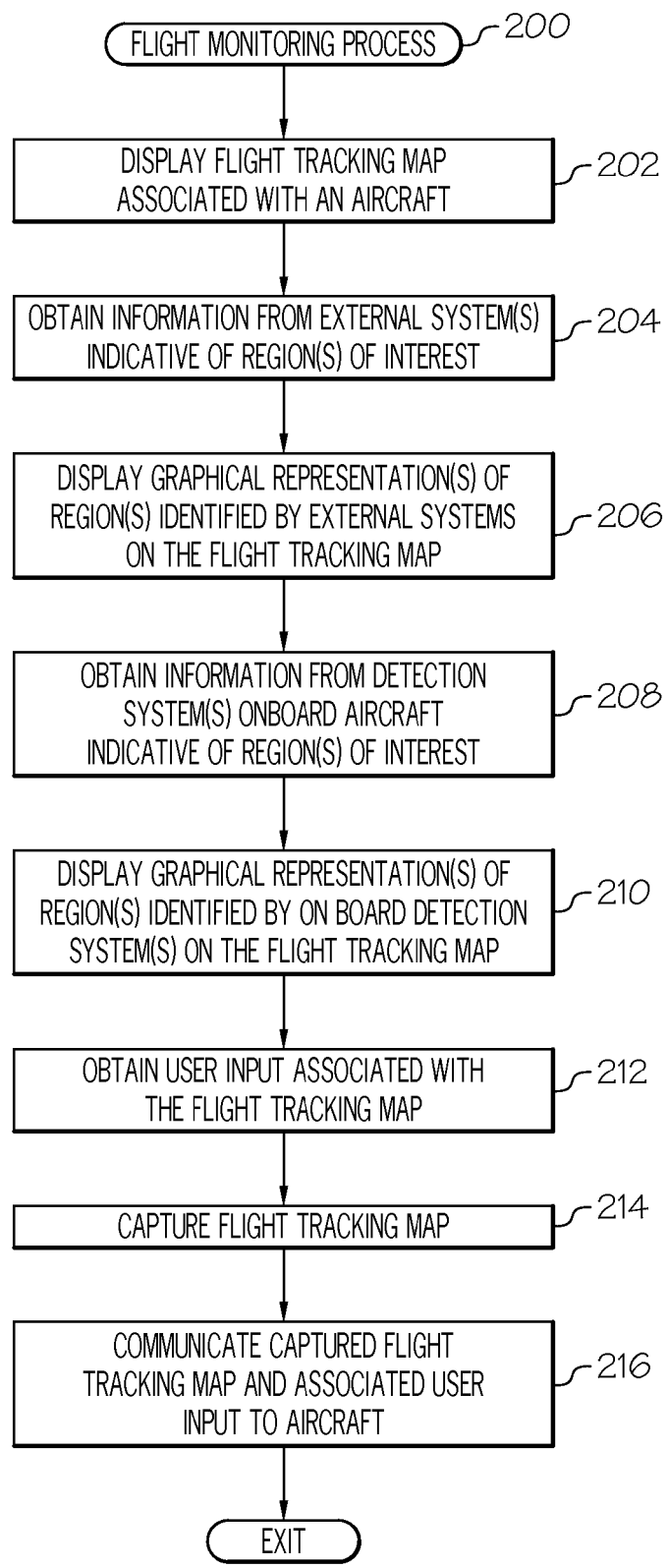
FIG. 2 is a flow diagram of an exemplary flight monitoring process suitable for use with the flight tracking system of FIG. 1 in accordance with one or more embodiments.

Referring now to FIG. 2, in an exemplary embodiment, the flight tracking system 100 is configured to perform a flight monitoring process 200 and additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the flight monitoring process 200 may be performed by different elements of the flight tracking system 100, such as, the user input device 106, the display device 108, the communications system 110, the processing system 112, the external monitoring system(s) 116, the display device 122, the user input device 124, the processing system 126, the display system 128, the communications system 130 and/or the onboard detection system(s) 138. It should be appreciated that the flight monitoring process 200 may include any number of additional or alternative tasks, the tasks need not be performed in the illustrated order and/or the tasks may be performed concurrently, and/or the flight monitoring process 200 may be incorporated into a more comprehensive procedure or process having additional functionality not described in detail herein. Moreover, one or more of the tasks shown and described in the context of FIG. 2 could be omitted from a practical embodiment of the flight monitoring process 200 as long as the intended overall functionality remains intact.

Still referring to FIG. 2, and with continued reference to FIG. 1, in an exemplary embodiment, the flight monitoring process 200 begins by rendering or otherwise displaying a flight tracking image associated with an aircraft being monitored on a display device at a flight tracking station on the ground (task 202). In accordance with one or more embodiments, the processing system 112 obtains the current location of the aircraft 120 (e.g., from the navigation system 132 and/or FMS 134 via communications systems 110, 130), and based on the location of the aircraft 120, the processing system 112 utilizes the information in the data storage element 114 to display a flight tracking map associated with the aircraft 120 on the display device 108. In this regard, the flight tracking map includes a background corresponding to a graphical representation of the terrain, topology, or other suitable items or points of interest within a geographic area proximate the aircraft 120. In various embodiments, the flight tracking map may also include graphical representations of nearby navigational reference points along with airspace designations and/or airspace restrictions, cities, towns, roads, railroads, and other geo-political information for the depicted geographic area. In an exemplary embodiment, the processing system 112 displays a graphical representation of the aircraft 120 overlying the terrain background and automatically updates or refreshes the flight tracking map as the aircraft travels 120 such that the aircraft graphic is positioned over the terrain background in a manner that accurately reflects the current (e.g., instantaneous or substantially real-time) real-world positioning of the aircraft 120 relative to the earth. Additionally, the flight tracking map may include a graphical representation of the projected flight path for the aircraft 120 based on the originally scheduled flight plan for the aircraft 120 that overlies the terrain background, such that the ground personnel tracking the aircraft 120 at the flight tracking station 104 can visually observe the upcoming flight path in relation to the current location of the aircraft 120 and/or the neighboring terrain, navigational reference points, points of interest, and the like.

In an exemplary embodiment, the flight monitoring process 200 continues by receiving or otherwise obtaining information indicative of one or more objects or regions of interest from one or more external monitoring systems and rendering or otherwise displaying graphical representation(s) of the information received from the external monitoring system(s) on the flight tracking map (tasks 204, 206). In this regard, for information received from one or more external monitoring systems 116, the processing system 112 may determine the geographic area and/or location corresponding to the received information and display a graphical representation of the received information on the flight tracking map that is positioned over the terrain background in a manner that accurately reflects real-world positioning of the received information relative to the earth and/or the aircraft 120. For example, the processing system 112 may receive information from a weather monitoring system 116 indicative of one or more meteorological regions (e.g., one or more regions of precipitation, turbulence, icing, convection, winds and/or wind shear, cloud cover, or the like) and display graphical representation(s) of the meteorological region(s) on the flight tracking map. In some embodiments, the processing system 112 may also receive information from one or more aviation monitoring systems 116 indicative of one or more navigational regions of interest (e.g., a region experiencing air traffic congestion, a region covered by temporary flight restrictions, or a region corresponding to a SIGMET, NOTAM, PIREP, or the like) and display graphical representation(s) of the region(s) identified by the aviation monitoring system(s) 116 on the flight tracking map. It should be noted that in practice, any number of meteorological regions and/or navigational regions indicated by the external monitoring system(s) 116 may be displayed on the flight tracking map concurrently. Further, it should be noted that in some embodiments, the ground personnel operating the flight tracking station 104 may manipulate the user input device 106 to selectively display a subset of the regions identified by the external monitoring systems 116. For example, the flight tracking map may include a graphical user interface (GUI) element (e.g., a check box, drop-down menu, radio button, list box, or the like) that allows the ground personnel to select particular type(s) of meteorological and/or navigational region(s) identified by the external monitoring system(s) 116 for display on the flight tracking map while unchecked meteorological region(s) and/or navigational region(s) are not displayed and excluded from the flight tracking map.

The illustrated flight monitoring process 200 continues by receiving or otherwise obtaining information indicative of one or more objects or regions of interest identified by the detection system(s) onboard the aircraft and rendering or otherwise displaying graphical representation(s) of the information from the onboard detection system(s) on the flight tracking map concurrently to displaying the graphical representations of information obtained from the external monitoring system(s) (tasks 208, 210). For example, as described in greater detail below in the context of FIGS. 3-4, in accordance with one or more embodiments, the ground processing system 112 transmits or otherwise communicates a request in accordance with an Internet protocol (IP) suite to the processing system 126 onboard the aircraft 120 via the network 118, for data and/or other information from the onboard detection system(s) 138 indicative of objects or regions of interest of the same type as those objects or regions of interest identified by the external monitoring system(s) 116 that are currently being presented on the display device 108 on the ground. Depending on the embodiment, the request may be realized as a hypertext transfer protocol (HTTP) GET request, a Simple Object Access Protocol (SOAP) message, an Advanced Message Queuing Protocol (AMQP) message, or another suitable transmission control protocol (TCP)/IP request message. In response to receiving the request message, the aircraft processing system 126 obtains the requested information from the onboard detection system(s) 138 and transmits or otherwise communicates, via the network 118, a response message to the ground processing system 112 that includes the requested information from the onboard detection system(s) 138. In this manner, the ground processing system 112 may pull the information from the onboard detection system(s) 138. In alternative embodiments, the information from the onboard detection system(s) 138 may be pushed to the flight tracking station 104 and/or ground processing system 112. For example, the aircraft processing system 126 may transmit or otherwise communicate a message (e.g., a HTTP POST request, a SOAP message, a AMQP message, or the like), to the ground processing system 112 via the network 118 that requests that the ground processing system 112 accept the data and/or other information from the onboard detection system(s) 138.

After obtaining information from the onboard detection system(s) 138, the ground processing system 112 updates the flight tracking map on the display device 108 to include graphical representations of the information from the onboard detection system(s) 138. For example, meteorological information received from an onboard weather radar system 138 may include radar imaging data along with settings data (e.g., the range setting, angle setting, and the like) that may be utilized by the ground processing system 112 in conjunction with the current aircraft heading and position to determine the geographic area and/or location corresponding to the radar imaging data. Thereafter, the ground processing system 112 may generate or otherwise provide, for display on the display device 108, a graphical representation of the radar imaging data on the flight tracking map that is positioned over the terrain background in a manner that accurately reflects real-world positioning of the received onboard meteorological information relative to the earth and/or the aircraft 120. In this regard, the ground processing system 112 effectively fuses the information from the external monitoring system(s) 116 with the information from the onboard detection system(s) 138 by presenting graphical representations of regions identified by the onboard detection system(s) 138 on the flight tracking map concurrently to the display of the graphical representations of regions identified by the external monitoring system(s) 116.

In practice, the information obtained from the onboard detection system(s) 138 may not be available from the external monitoring system(s) 116 and vice versa, combining the graphical representations on the same display that also includes the projected flight path for the aircraft 120 provides a more comprehensive representation of the current and/or upcoming operation of the aircraft 120, thereby improving the situational awareness of the ground personnel. For example, a flight dispatcher may be able to concurrently view meteorological regions currently detected in the vicinity of the aircraft 120 by an onboard weather radar system 138 along with forecasted meteorological regions in the vicinity of the upcoming portion of the flight path identified by an external weather monitoring system 116, and assess the relative impact of both the current meteorological regions and forecasted meteorological regions when determining how to proceed with operation of the aircraft 120.

Still referring to FIG. 2, the illustrated flight monitoring process 200 continues by receiving or otherwise obtaining user input associated with the flight tracking map (task 212). In this regard, after ground personnel makes an assessment of the potential impact of both the regions identified by the onboard detection system(s) 138 and the regions identified by the external monitoring system(s) 116, the ground personnel may manipulate the user input device 106 to annotate or otherwise add a textual message to the flight tracking map that explains or otherwise pertains to his or her assessment of the potential impact, propose modifications to the upcoming flight path, or the like. For example, a flight dispatcher at the flight tracking station 104 may manipulate the user input device 106 to provide a comment, message, or other textual information that annotates, explains, or otherwise elucidates the dispatchers assessment of the regions displayed on the flight tracking map. In this regard, the flight tracking display on the display device 108 may include a GUI element adapted to receive textual input (e.g., a text box or the like), with the flight dispatcher manipulating the user input device 106 to provide his or her assessment of the potential impact of the meteorological region(s) and/or navigational region(s) displayed on the flight tracking map with respect to upcoming operation of the aircraft 120. Additionally or alternatively, the flight dispatcher may manipulate the user input device 106 to modify at least a portion of the upcoming flight path of the aircraft 120 (e.g., by adding and/or removing waypoints) to deviate from the original flight plan to circumnavigate or otherwise avoid the meteorological region(s) and/or navigational region(s) that would otherwise be likely to impact operation of the aircraft 120.

In an exemplary embodiment, the flight monitoring process 200 continues by capturing the flight tracking image at the flight tracking station and transmitting or otherwise communicating the captured flight tracking image and the associated user input to the aircraft for presentation onboard the aircraft (tasks 214, 216). In this regard, the ground personnel at the flight tracking station 104 manipulates the user input device 106 to capture, copy, record, or otherwise store the displayed flight tracking map at a particular instant in time to obtain a captured flight tracking image that corresponds to a screenshot (or screengrab) of the flight tracking map (or a cropped portion thereof) at the instant in time the user input device 106 is manipulated to initiate the capture. For example, the ground processing system 112 may generate or otherwise create an image file that encapsulates or otherwise includes at least a portion of the displayed content on the display device 108. Thus, when the ground personnel at the flight tracking station 104 observes a meteorological region(s) and/or navigational region(s) that overlaps a portion of the upcoming flight path for the aircraft 120 or is otherwise likely to impact upcoming operation of the aircraft 120, the ground personnel may manipulate the user input device 106 to capture or otherwise record the current state of the flight tracking map that depicts the relationship of the meteorological region(s) and/or navigational region(s) with respect to the current location of the aircraft 120 and/or the projected flight path for the aircraft 120.

The captured flight tracking image includes the graphical representation(s) of meteorological region(s) and/or navigational region(s) identified by the onboard detection system(s) 138 that are currently displayed on the ground display device 108 at the time of capture, along with the graphical representation(s) of meteorological region(s) and/or navigational region(s) identified by the external monitoring system(s) 116 that are currently displayed on the ground display device 108 at the time of capture. Additionally, in one or more exemplary embodiments, any modifications to the flight plan and/or annotations provided by the ground personnel are also embedded within the captured flight tracking image. Thus, when the captured flight tracking image is communicated or otherwise transmitted to the aircraft 120 for display on the display device 122, the pilot and/or co-pilot of the aircraft 120 may review the annotations and/or modifications provided ground personnel and make his or her own assessment of the potential impact of the displayed meteorological region(s) and/or navigational region(s) on upcoming operation of the aircraft 120.

In exemplary embodiments, the ground processing system 112 transmits or otherwise communicates the captured flight tracking image to the aircraft 120 by initiating or otherwise establishing a communications session with the aircraft processing system 126 via the network 118, then uploading or otherwise transferring the image file corresponding to the captured flight tracking image over the network 118 within the communications session in accordance with a suitable Internet protocol. For example, the ground processing system 112 may establish a point-to-point connection over the network 118 with the aircraft processing system 126, and then transmit the captured image file to the aircraft processing system 126 via the established connection. In this manner, the captured flight tracking image may be uploaded to the aircraft 120 without any affirmative action by the pilot and/or co-pilot of the aircraft 120. Additionally, the captured flight tracking image is not broadcast for receipt and/or interception by other aircraft or third parties.

In exemplary embodiments, in response to receiving the captured flight tracking image from the flight tracking station 104, the aircraft processing system 126 generates or otherwise provides a graphical notification of the captured flight tracking image on the onboard display device 122 along with a GUI element that may be manipulated by the pilot, co-pilot, or other crew member to view the captured flight tracking image on the display device 122. In response to the pilot manipulating the GUI element, the aircraft processing system 126 and/or display system 128 displays or otherwise presents the captured flight tracking image on the onboard display device 122. As described in greater detail below in the context of FIGS. 7-8, in exemplary embodiments, the captured flight tracking image may be presented on the onboard display device 122 with the same display settings (e.g., the same level of zoom, cropping, scaling, etc.). Thus, the onboard display device 122 may be effectively synchronized with the ground display device 108, such that the ground personnel and the pilot are viewing the same flight tracking image, in terms of both content and display settings.

FIGS. 3-6 depict an exemplary sequence of flight tracking displays that may be displayed or otherwise presented on the ground display device 108 at the flight tracking station 104 in accordance with one exemplary embodiment of the flight monitoring process 200 of FIG. 2. The displayed flight tracking image 300 of FIG. 3 corresponds to the state of the ground display device 108 in response to ground personnel manipulating or otherwise selecting a GUI element 301 corresponding to the particular aircraft 120 from among a plurality of aircraft that may be monitored at the flight tracking station 104. As described above, in an exemplary embodiment, the ground processing system 112 obtains the current location of the aircraft 120 and displays a flight tracking map on the display device 108 that includes the terrain background 302, which graphically represents the terrain, topology, and geopolitical information for the geographic area depicted in the flight tracking map. The ground processing system 112 also displays the graphical representation 304 of the aircraft 120 that is positioned overlying the terrain background 302 in a manner that accurately reflects the current location and heading of the aircraft 120. Additionally, the ground processing system 112 may obtain the current flight plan for the aircraft 120 and generate or otherwise provides a graphical representation of a projected flight path 308 for the aircraft 120 based on the navigational reference points of the flight plan. In this regard, the graphical representation of the projected flight path 308 includes graphical representations of the individual navigational reference points of the flight plan that define the respective flight path 308 along with graphical representations of the navigational segments between successive navigational reference points of the flight plan.

Figure 3:
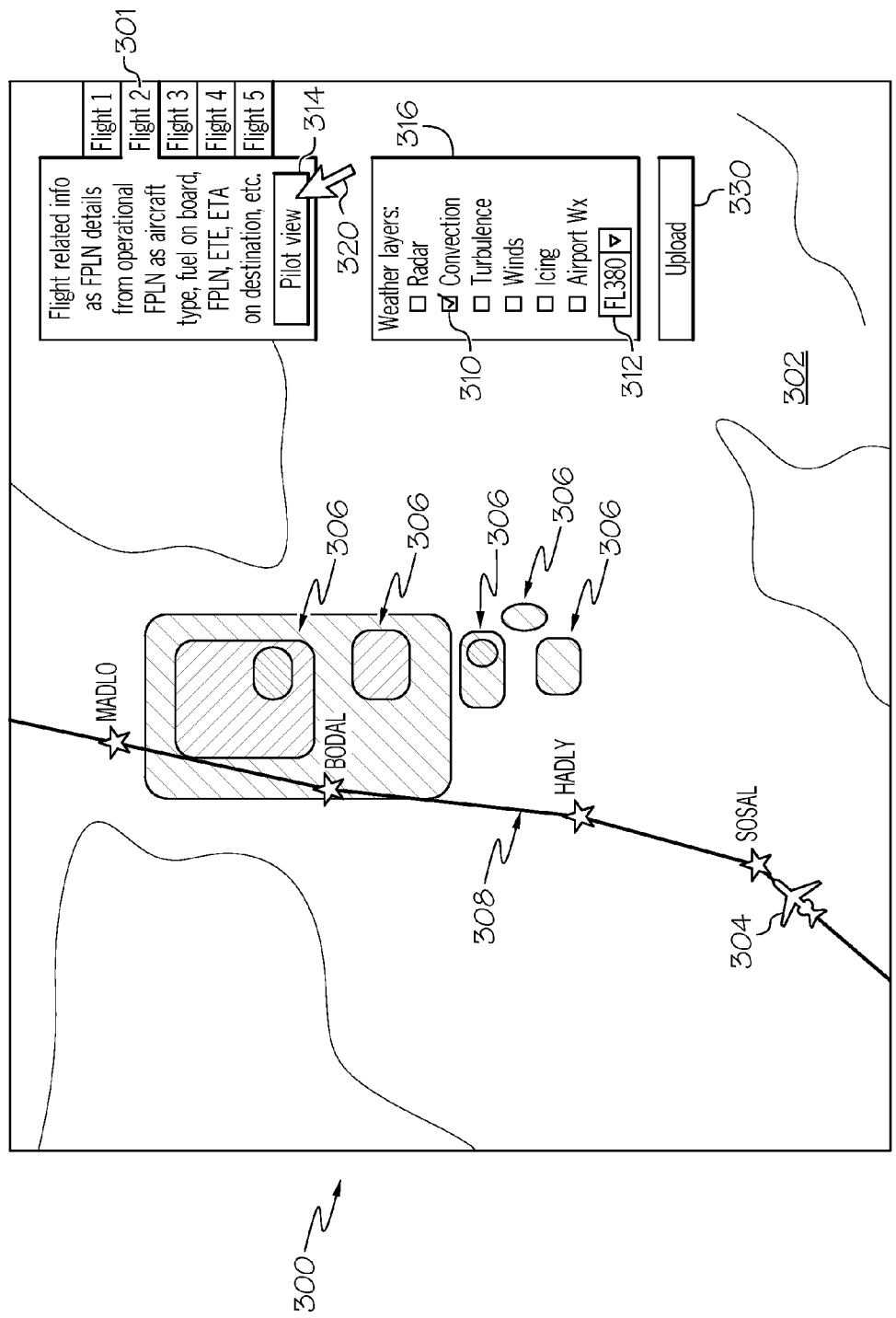
FIGS. 3-6 depict an exemplary sequence of flight tracking image displays suitable for display on a display device associated with a flight tracking station in the flight tracking system of FIG. 1 in accordance with one or more embodiments of the exemplary flight monitoring process of FIG. 2.

The displayed flight tracking image 300 also includes graphical representations of meteorological regions 306 that are identified or otherwise indicated by an external monitoring system 116. For example, the flight tracking display on the display device 108 may include legend 316 containing a plurality of GUI elements that are selectable by the ground personnel (e.g., using a cursor or pointer 320 associated with the user input device 106) to select or otherwise indicate the particular type of meteorological and/or navigational region(s) that the user would like to view along with the altitude (or flight level) for which the user would like to view the selected type of information. In this regard, FIG. 3 depicts a GUI element 310 (e.g., a checkbox) that is selected by the ground personnel to indicate the particular type of meteorological region (e.g., convection regions) that the user would like to view along with another GUI element 312 (e.g., a pull-down or drop-down menu) manipulated by the ground personnel to select the altitude (or flight level) for which the user would like to view the selected type of information. In the illustrated embodiment, in response to the user manipulating the GUI elements 310, 312, the ground processing system 112 receives or otherwise obtains, from an external weather monitoring system 116, information corresponding to convective activity identified, detected, or forecasted at the selected flight level and displays graphical representations of the convective regions 306 identified by the external weather monitoring system 116 overlying the terrain background 302.

Figure 4:
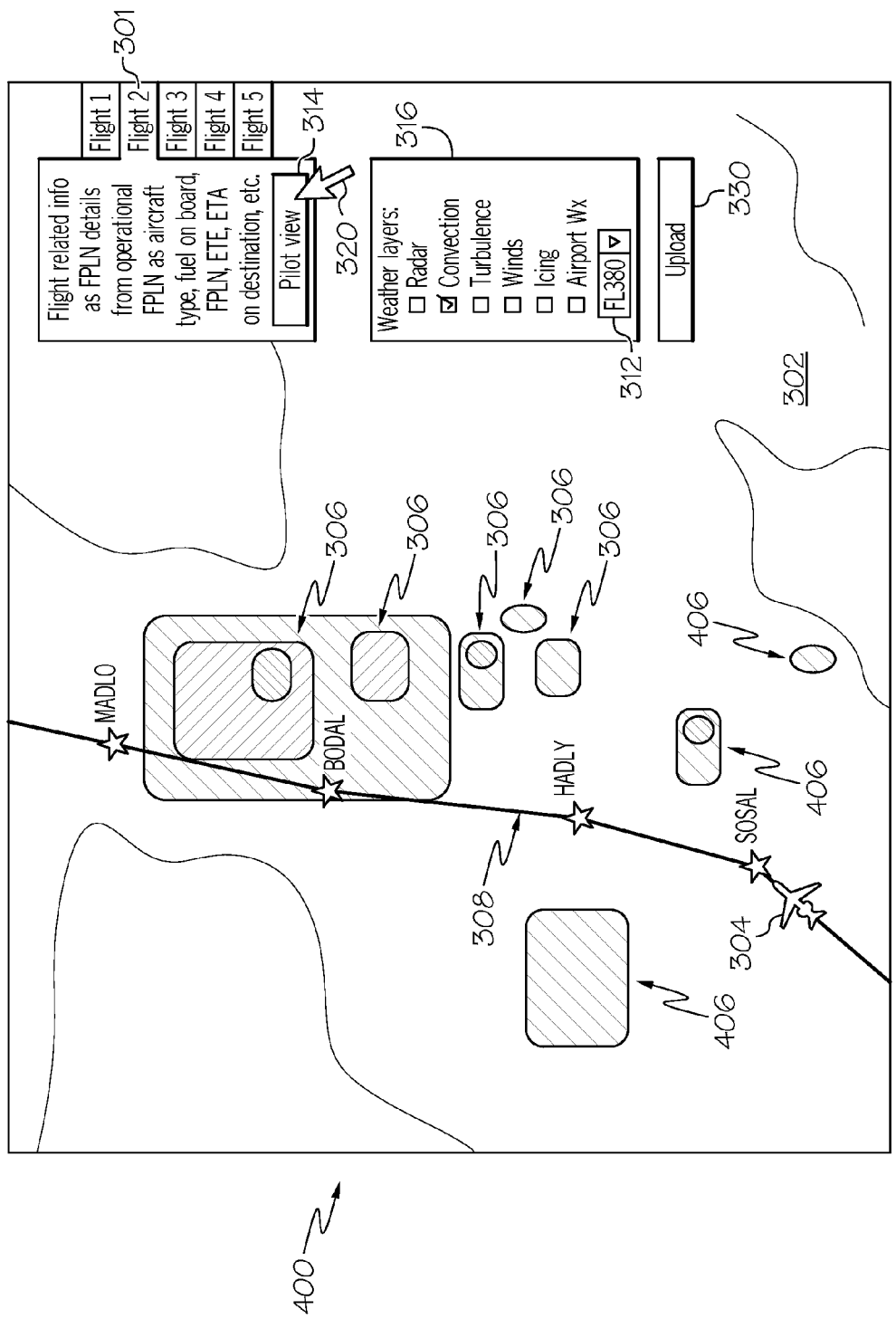

Referring now to FIGS. 3-4, in exemplary embodiments, the flight tracking display on the ground display device 108 includes a selectable GUI element 314 (e.g., a button or the like) that may be manipulated by the user to retrieve or otherwise obtain information from the detection system(s) 138 onboard the aircraft 120. In this regard, in response to the user selecting the GUI element 314, the ground processing system 112 may transmit or otherwise provide, via the network 118, a request for information pertaining to convective activity identified by an onboard weather detection system 138. In response, the aircraft processing system 126 obtains the requested information from the onboard weather detection system 138 and transmits or otherwise provides a response including the requested information to the ground processing system 112. In this regard, the response provided by the aircraft processing system 126 may include the data indicative of the detected convective activity along with information pertaining to the settings for the onboard weather detection system 138, which, in turn, enable the ground processing system 112 to determine the relative geographical location of the convective regions identified by the onboard weather detection system 138 along with the relative altitude of the convective regions. Thereafter, the ground processing system 112 generates or otherwise provides, on the display device 108, graphical representations of the convective regions 406 identified by the onboard detection system 138 at the selected flight level in a manner that accurately reflects real-world positioning of the detected convective regions 406, resulting in the flight tracking image 400 of FIG. 4.

It should be noted that in some embodiments, the legend 316 for the flight tracking map on the ground display device 108 may be synchronized with a display on the aircraft display device 122 in response to the user selecting the GUI element 314. For example, in response to the user selecting the GUI element 314, the ground processing system 112 may transmit or otherwise provide, via the network 118, a request for information pertaining to current display onboard the aircraft 120. In response, the aircraft processing system 126 may transmit a response including information from the onboard detection system(s) 138 and identifying the corresponding display criteria associated therewith (e.g., the type of region(s) that the data corresponds to, the flight level being presented on the display device 122, and the like). Based on the response, the ground processing system 112 may identify or otherwise determine that the information from the onboard detection system(s) 138 correspond to a particular type of region, generate appropriate graphical representations of those regions and display those on the ground display device 108, and request the corresponding information from the external monitoring system(s) 116 for presentation on the ground display device 108. For example, in response to determining the information received from the aircraft 120 corresponds to convective activity at a particular flight level, the ground processing system 112 may automatically request information pertaining to detected and/or forecasted convective activity at that flight level from an external weather monitoring system 116 and generate corresponding graphical representations of the requested information received from the external weather monitoring system 116.

Figure 5:
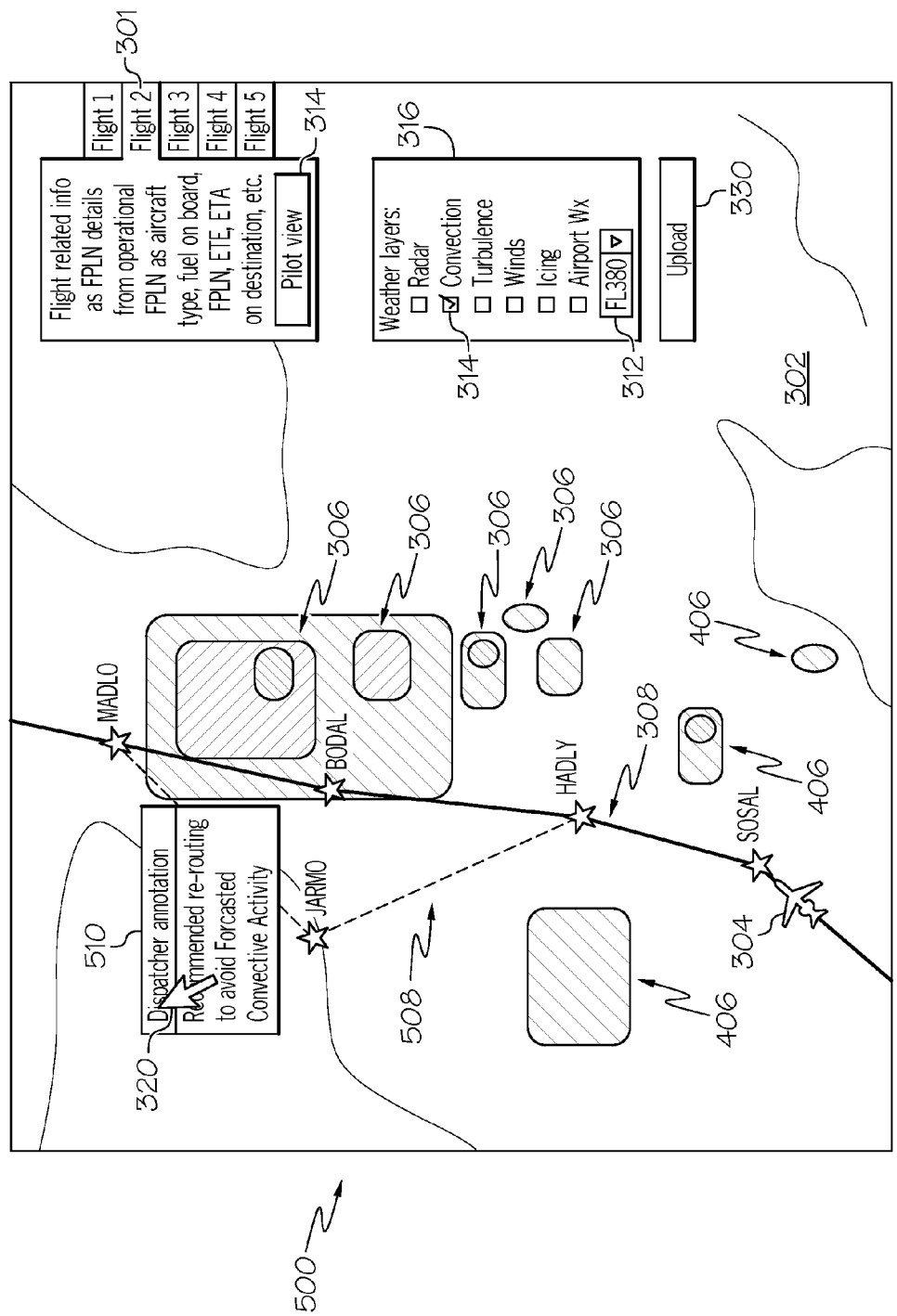

Referring now to the flight tracking image 500 of FIG. 5, when the ground personnel at the flight tracking station 104 determines the one or more of the displayed regions 306, 406 is likely to impact upcoming operation of the aircraft 120, the ground personnel may manipulate the user input device 106 to propose modifications to the flight plan. For example, the ground personnel may manipulate the user input device 106 to input or otherwise select the waypoint JARMO for insertion into the aircraft flight plan between the HADLY waypoint and the MADLO waypoint instead of the originally planned BODAL waypoint to circumvent the convective regions 306 identified by the external monitoring system 116 (e.g., forecasted convective activity) without incursions into the convective regions 406 currently detected by the onboard detection system 138. In response to receiving a modification to the flight plan, the ground processing system 112 may automatically update the flight tracking display by generating or otherwise providing a graphical representation of a modified flight path 508 for the aircraft 120 between the HADLY waypoint and the MADLO waypoint. In some embodiments, the modified flight path 508 is rendered or otherwise displayed using a different visually distinguishable characteristic (e.g., visually distinguishable color, hue, tint, brightness, graphically depicted texture or pattern, contrast, transparency, opacity, shading, animation, and/or other graphical effects) relative to the original projected flight path 308 such that the modified flight path 508 can be readily ascertained and distinguished from the original flight path 308, and vice versa. After creating the modified flight path 508, the ground personnel at the flight tracking station 104 may also annotate or otherwise provide textual information to explain the flight tracking image to be communicated to the aircraft 120. For example, in the illustrated embodiment, the ground personnel may manipulate the user input device 106 to create a text box 510 overlying the terrain background 302 (e.g., by selecting a desired location on the flight tracking image 500 with the pointer 320) and provide textual information explaining that the flight tracking image contains a proposed modification to the flight plan.

Figure 6:
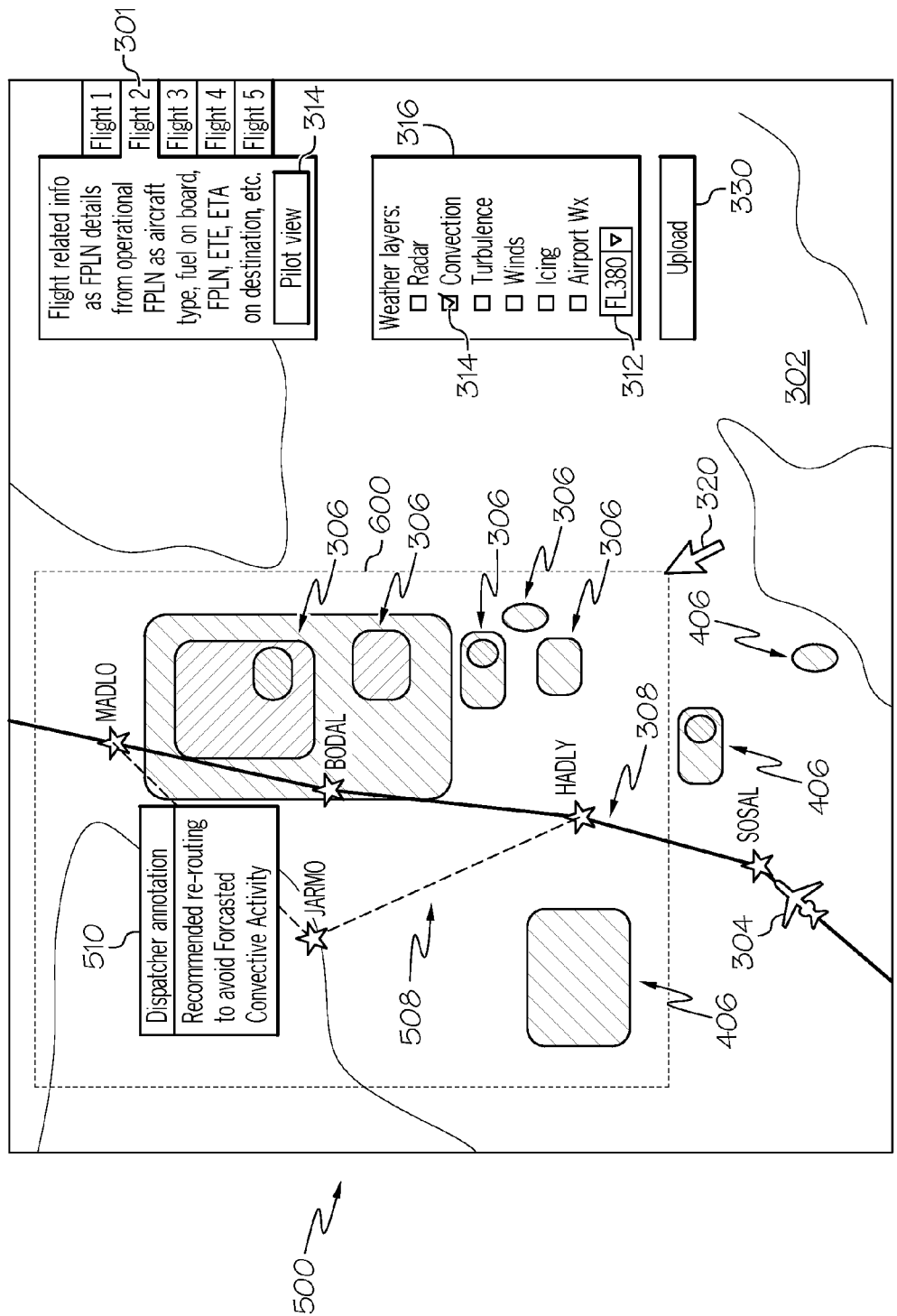
Figure 7:
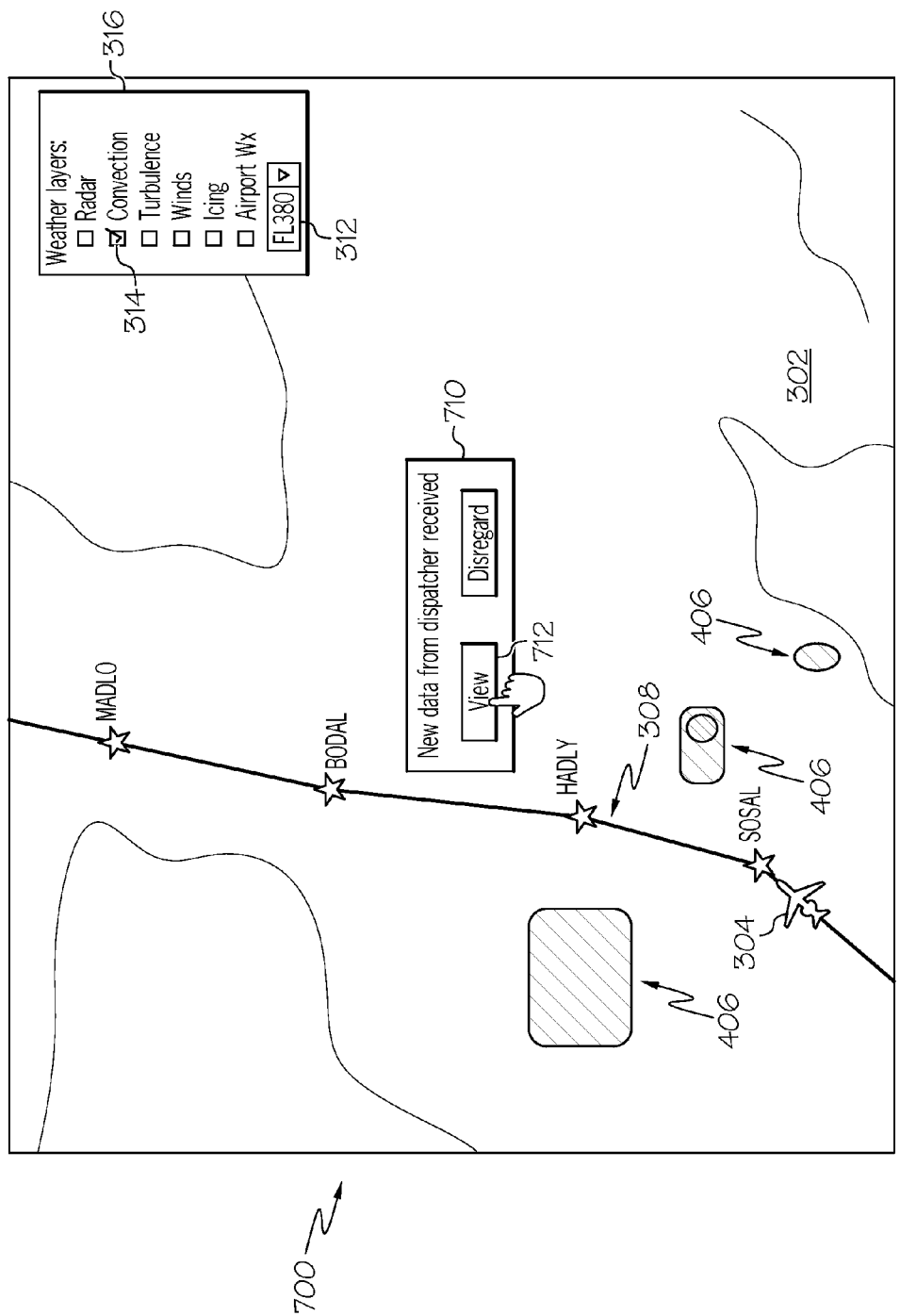
FIGS. 7-8 depicts an exemplary sequence of displays suitable for display onboard the aircraft in the flight tracking system of FIG. 1 in conjunction with the sequence of FIGS. 3-6 in accordance with one or more embodiments of the exemplary flight monitoring process of FIG. 2.
Figure 8:
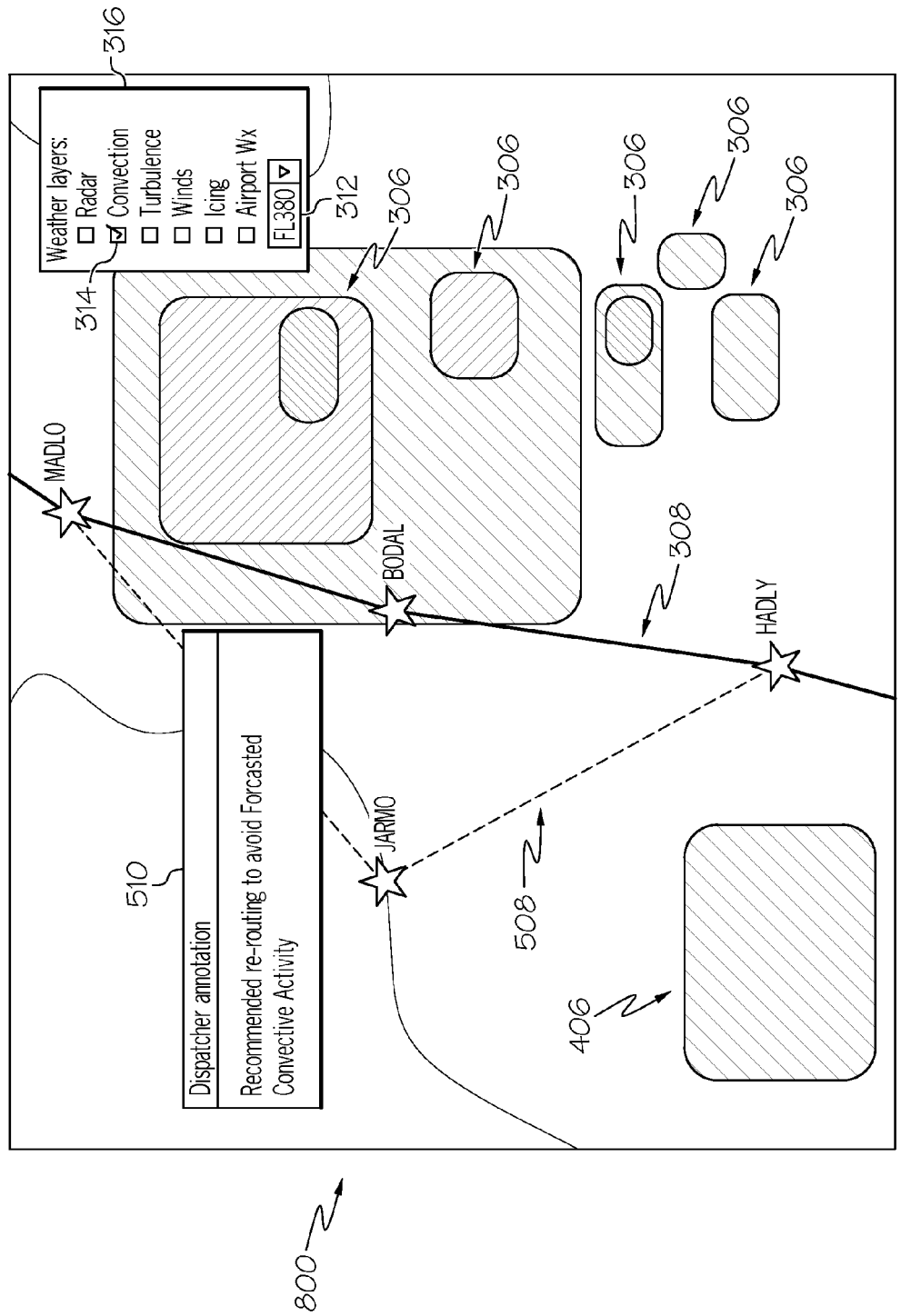

Referring now to FIG. 6-8, the ground personnel manipulates the user input device 106 to capture at least a portion 600 of the flight tracking image 500, resulting in a captured flight tracking image that includes the graphical representations of one or more of the region(s) 406 currently detected by the onboard detection system(s) 138, the region(s) 306 identified by the external monitoring system(s) 118, the modified flight path 508 proposed by the ground personnel, and the annotation(s) 510 provided by the ground personnel. Additionally, in exemplary embodiments, a legend 316 indicating the particular type(s) of regions presented on the flight tracking image and the particular altitude (or flight level) for the presented regions is also included, integrated, embedded, or otherwise encapsulated in the captured flight tracking image. In the illustrated embodiment, to initiate the capture, the ground personnel manipulates the pointer 320 via the user input device 106 to select the portion 600 of the flight tracking image 500 that the user would like to capture before selecting a GUI element 330 to initiated the capture and subsequent transmission to the aircraft 120.

In response to the user selecting the upload GUI element 330 after selecting the desired portion 600 of the flight tracking image 500, the ground processing system 112 automatically creates or otherwise generates an image file corresponding to the selected portion 600 of the flight tracking image 500 by cropping, zooming and/or scaling the flight tracking image 500 to fit the selected portion 600 to the display area of the aircraft display device 122. In exemplary embodiments, the annotation 510 is embedded in the captured flight tracking image. In this regard, the captured flight tracking image file created by the ground processing system 112 corresponds to a cropped screenshot (or screengrab) of the selected portion 600 of the flight tracking image 500. Additionally, the ground processing system 112 may automatically determine a location within the selected portion 600 where the legend 316 and be presented without obfuscating the modified flight path 508, the dispatcher annotation 510, and the meteorological regions 306, 406 presented within the selected portion 600 and embed or otherwise integrate the legend 316 into the captured flight tracking image. In this regard, the ground processing system 112 effectively overlies the legend 316 over a portion of the terrain background 302 within the selected portion 600. After creating the captured flight tracking image file, the ground processing system 112 automatically transmits or otherwise communicates the captured flight tracking image file to the aircraft 120. For example, as described above, as described above, the ground processing system 112 may automatically initiate establishment of a peer-to-peer communications session with the aircraft processing system 126 via the network 118 and then upload the captured flight tracking image file to the aircraft processing system 126 via the peer-to-peer communications session.

As illustrated in FIG. 7, in response receiving the captured flight tracking image file from the flight tracking station 104, the aircraft processing system 126 may automatically generate or otherwise provide a notification to the pilot and/or co-pilot that indicates an uploaded image is available for viewing in lieu of the flight tracking image 700 currently displayed on the aircraft display device 122. For example, the aircraft processing system 126 may generate or otherwise provide a text box 710 overlying the flight tracking image 700 that indicates information from the flight tracking station 104 is available for viewing, with the text box 710 including a GUI element 712 selectable by the pilot (e.g., by manipulating the user input device 124) for viewing the received information.

As illustrated in FIG. 8, in response to the pilot selecting the GUI element 712, the aircraft processing system 126 automatically updates the display device 122 by rendering or otherwise displaying the captured flight tracking image file received from the flight tracking station 104 on the display device 122. The captured flight tracking image 800 corresponds to the selected portion 600 of the flight tracking image 500 at the time the ground personnel selected the upload GUI element 330, with the captured flight tracking image 800 including the modified flight path 508, the dispatcher annotation 510, and the forecasted convective regions 306 and the currently detected convective regions 406 within the selected portion 600, along with the legend 316 corresponding to the flight tracking image 500. As described above, in exemplary embodiments, the captured flight tracking image 800 is also cropped or otherwise zoomed to fit the display area of the aircraft display device 122.

In some embodiments, after generating the captured flight tracking image file, the ground processing system 112 may also automatically update the ground display device 108 to present the captured flight tracking image 800 on the display device 108 at the same level of cropping and/or zooming as will be provided on the aircraft display device 122. Thus, the display devices 108, 122 may be effectively synchronized with the same content being displayed on both display devices 108, 122 with the same display settings, thereby improving the level of understanding between the ground personnel and the pilot and/or co-pilot with respect to the operation of the aircraft 120. At the same time, the ground personnel is able to view graphical representations of regions 406 that are based on information from the onboard detection system(s) 138, which may otherwise be unavailable at the ground operations center 102 or from the external monitoring system(s) 116. Likewise, the pilot, co-pilot and/or other crew member is able to view graphical representations of regions 306 that are based on information from the external monitoring system(s) 116 (e.g., forecasted weather information, weather information for larger geographical areas and/or altitude ranges, or the like), which may otherwise be unavailable at the aircraft 120 using the onboard detection system(s) 138. Thus, the overall situational awareness of both the ground personnel and the onboard personnel is improved.

For the captured flight tracking image 800 illustrated in FIG. 8, the pilot and/or co-pilot of the aircraft 120 may concurrently view the current location of the convective region(s) 406 currently detected by an onboard weather detection system 138, the current location of the expected convective region(s) 306 forecasted by an external weather monitoring system 116, the original flight path 308, the modified flight path 508 proposed by the ground personnel, the positioning and/or relationship of the convective regions 306, 406 with respect to the aircraft 120 and/or the flight paths 308, 508, and the explanatory comments 510 provided by the ground personnel monitoring the aircraft 120 at the flight tracking station 104. The pilot and/or co-pilot may thereby determine how to proceed operating the aircraft 120 (e.g., determining whether or not to execute the modified flight path 508 or stay on the original flight path 308) with improved situational awareness. It should be noted that in some embodiments, when the flight tracking station 104 is tracking or monitoring a plurality of aircraft, information obtained detection systems onboard aircraft other than aircraft 120 may also be fused or otherwise incorporated into the flight tracking images at the ground display device 108 and included in the captured flight tracking image, such that the pilot and/or co-pilot may also view meteorological regions currently detected by other aircraft concurrently to viewing meteorological regions currently detected by the onboard detection system 138 and the meteorological regions currently detected and/or forecasted by an external weather system 116, thereby providing additional situational awareness.

Figure 9:
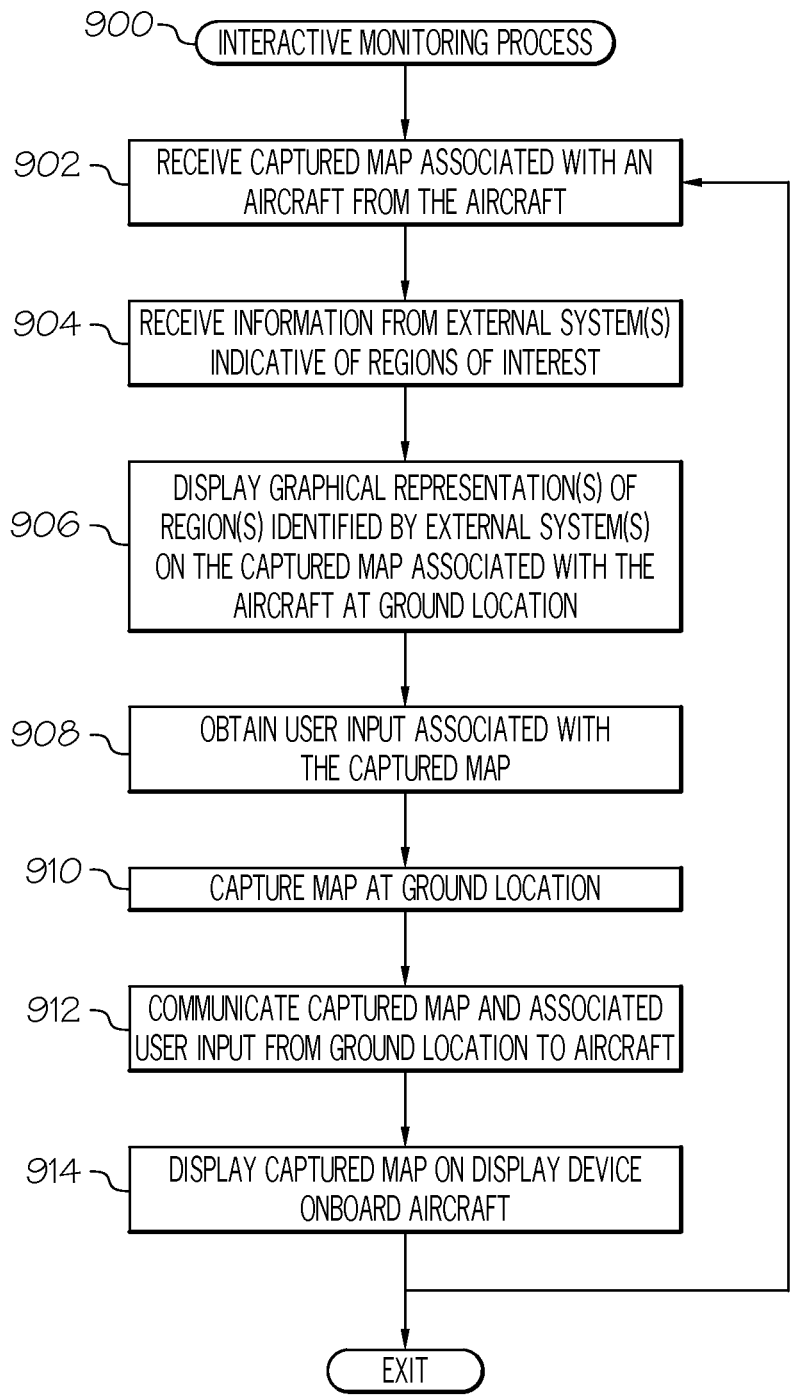
FIG. 9 is a flow diagram of an exemplary interactive monitoring process suitable for use with the flight tracking system of FIG. 1 in accordance with one or more embodiments.

FIG. 9 depicts an exemplary interactive monitoring process 900 that may be implemented by the flight tracking system 100. The various tasks performed in connection with the illustrated process 900 may be implemented using hardware, firmware, software executed by processing circuitry, or any combination thereof. For illustrative purposes, the following description may refer to elements mentioned above in connection with FIG. 1. In practice, portions of the interactive monitoring process 900 may be performed by different elements of the flight tracking system 100, such as, the user input device 106, the display device 108, the communications system 110, the processing system 112, the external monitoring system(s) 116, the display device 122, the user input device 124, the processing system 126, the display system 128, the communications system 130 and/or the onboard detection system(s) 138. It should be appreciated that the interactive monitoring process 900 may include any number of additional or alternative tasks, the tasks need not be performed in the illustrated order and/or the tasks may be performed concurrently, and/or the interactive monitoring process 900 may be incorporated into a more comprehensive procedure or process having additional functionality not described in detail herein. Moreover, one or more of the tasks shown and described in the context of FIG. 9 could be omitted from a practical embodiment of the interactive monitoring process 900 as long as the intended overall functionality remains intact.

The illustrated interactive monitoring process 900 begins by receiving or otherwise obtaining, at a flight tracking station on the ground, a captured map associated with an aircraft from the aircraft, where the captured map includes graphical representations of regions identified by one or more detection system(s) onboard the aircraft (task 902). In this regard, in a similar manner as described above in the context of the ground processing system 112 displaying and capturing a flight tracking map on the ground display device 108, the aircraft processing system 126 may display a flight tracking map associated with the aircraft 120 that includes graphical representations of meteorological and/or navigational regions identified by the onboard detection system(s) 138. As described in greater detail below in the context of FIG. 10, to initiate the interactive monitoring process 900, the pilot, co-pilot and/or other onboard personnel may manipulate the user input device 124 to capture the flight tracking map presented on the onboard display device 122 and transmit the captured flight tracking image to the flight tracking station 104 via the network 118.

Still referring to FIG. 9, in exemplary embodiments, the interactive monitoring process 900 continues by receiving or otherwise obtaining information indicative of one or more objects or regions of interest from one or more external monitoring systems and rendering or otherwise displaying graphical representation(s) of the information received from the external monitoring system(s) on the captured flight tracking map received from the aircraft (tasks 904, 906). In this regard, the ground processing system 112 generates graphical representations based on information obtained from the external monitoring system(s) 116 that corresponds to the geographical area of the captured flight tracking map received from the aircraft 120 and renders the graphical representations of region(s) identified by the external monitoring system(s) 116 on or overlying the captured flight tracking map on the display device 108. Thus, the ground processing system 112 fuses or otherwise integrates the graphical representations of region(s) identified by the external monitoring system(s) 116 into the captured flight tracking map provided by the aircraft 120. In exemplary embodiments, the ground processing system 112 determines the geographical area corresponding to the captured flight tracking map from the aircraft 120 and receives or otherwise obtains information from the external monitoring system(s) 116 corresponding to that geographical area. In some embodiments, the ground processing system 112 identifies or otherwise determines the particular type(s) of meteorological and/or navigational regions presented on the captured flight tracking map, and requests the identified type(s) of information from the external monitoring system(s) 116. Thereafter, the ground processing system 112 creates the corresponding graphical representations of the region(s) identified by the external monitoring system(s) 116 and concurrently displays, on the display device 108, the region(s) at the appropriate real-world locations on the captured flight tracking map relative to the region(s) identified by the onboard detection system(s) 138 and/or other graphical elements on the captured flight tracking map.

In a similar manner as described above, the interactive monitoring process 900 continues by receiving or otherwise obtaining user input corresponding to modifications and/or annotations to the flight tracking map on the ground display device, capturing the modified and/or annotated flight tracking image at the flight tracking station and transmitting or otherwise communicating the captured flight tracking image and the associated user input to the aircraft for presentation onboard the aircraft (tasks 908, 910, 912, 914). In this regard, the ground personnel may manipulate the user input device 106 to propose modifications to the upcoming flight path and/or annotate or otherwise add a textual message to the fused flight tracking map before manipulating the user input device 106 to capture the displayed flight tracking map. Thus, the captured flight tracking map corresponds to at least a portion the captured flight tracking map received from the aircraft 120 (which includes region(s) identified by onboard detection system(s) 138) that also includes fused and/or overlying region(s) identified by the external monitoring system(s) 116 and flight path modifications and/or annotations provided by the ground personnel. As described above, the ground processing system 112 creates an image file representative of the captured flight tracking image and automatically transmits or otherwise provides the captured flight tracking image file to the aircraft 120 via the network 118 for presentation on the onboard display device 122. Thereafter, the pilot, co-pilot and/or other onboard personnel reviews the captured flight tracking image received from the flight tracking station 104 and determines how to best proceed with upcoming operation of the aircraft 120.

In some embodiments, the interactive monitoring process 900 may be repeated with the pilot, co-pilot and/or other onboard personnel manipulate the user input device 124 to propose flight path modifications relative to the proposed flight path modifications presented in the captured flight tracking image from the flight tracking station 104, annotate or otherwise add a textual message to the displayed flight tracking map, and manipulating the user input device 124 to capture the updated flight tracking map displayed on the onboard display device 122 and transmit the corresponding image file to the flight tracking station 104 via the network 118. In response to receiving the updated captured flight tracking image from the aircraft 120 (task 902), the ground processing system 112 updates the flight tracking image as appropriate to include region(s) identified by the external monitoring system(s) 116 and allows the ground personnel to further modify and/or annotate the flight tracking map for subsequent capturing and transmission to the aircraft 120 (tasks 904, 906, 908. 910, 912). In this manner, a flight dispatcher at the flight tracking station 104 and the pilot of the aircraft 120 may iteratively exchange captured flight tracking images that include graphical representations of regions identified by both the onboard detection system(s) 138 and the external monitoring system(s) 116 along with modifications and/or annotations provided by the individual responsible for capturing and/or transmitting the image until the flight dispatcher and the pilot mutually agree on the best course of action for upcoming operation of the aircraft 120.

Figure 10:
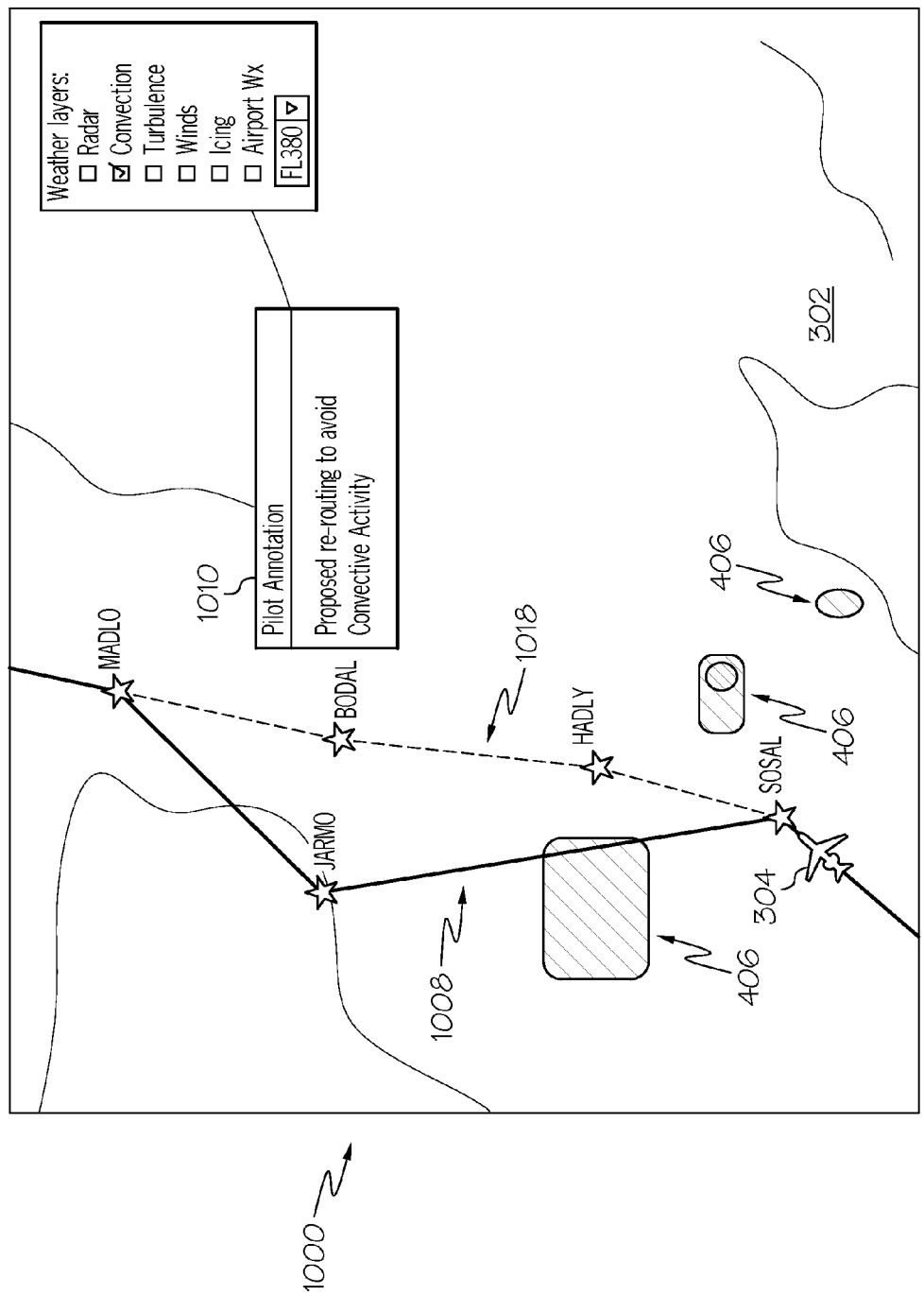
FIG. 10 depicts an exemplary flight tracking image display suitable for display on a display device of the flight tracking system of FIG. 1 in accordance with an exemplary embodiment of the interactive monitoring process of FIG. 9.

FIG. 10 depicts an exemplary flight tracking image 1000 which may be displayed on the onboard display device 122, captured by the aircraft processing system 126, and subsequently transmitted to the flight tracking station 104 for presentation on the ground display device 108 in conjunction with the interactive monitoring process 900 of FIG. 9 and/or the monitoring process 200 of FIG. 2. For example, the pilot, co-pilot, or other onboard personnel may review the flight tracking image 1000 on the onboard display device 122 and determine that the original flight plan is likely to traverse a meteorological region identified by an onboard weather system 138 when a displayed meteorological region 406 overlaps the graphical representation projected flight path 1008 for the original flight plan from the SOSAL waypoint to the MADLO waypoint via the JARMO waypoint. In a similar manner as described above, the pilot may manipulate the user input device 124 to input or otherwise select alternative waypoints for insertion into the aircraft flight plan between the SOSAL waypoint and the MADLO waypoint instead of the originally planned JARMO waypoint to avoid the convective regions 406 identified by the onboard detection system 138, with the aircraft processing system 126 displaying a corresponding graphical representation of the modified flight path 1018 on the display device 122. The onboard personnel may also add an annotation 1010 to the flight tracking image 1000 before manipulating the user input device 124 to cause the aircraft processing system 126 to capture the flight tracking image, establish a communications session over the network 118 with the ground processing system 112, and transmit the captured flight tracking image 1000 to the flight tracking station 104 via the network 118.

After receiving the captured flight tracking image 1000, the ground processing system 112 updates the ground display device 108 by displaying or otherwise presenting the captured flight tracking image 1000 on the display device 108. The ground processing system 112 receives information corresponding to the geographical area of the captured flight tracking image 1000 from the external monitoring system(s) 116 and displays the corresponding graphical representations of the regions 306 identified by the external monitoring system(s) 116 on or overlying the captured flight tracking image 1000 on the ground display device 108. Thereafter, when a flight dispatcher determines that the flight path 1018 proposed by the pilot is likely to traverse forecasted convective regions (e.g., based on forecast information unavailable onboard the aircraft 120), the ground personnel may manipulate the user input device 106 to input or otherwise select the waypoint JARMO for insertion into the pilot's proposed flight plan between the HADLY waypoint and the MADLO waypoint in lieu of the proposed BODAL waypoint, resulting in the modified flight path 508 relative to the pilot's proposed flight path 1018. Thereafter, the flight dispatcher may manipulate the user input device 106 to capture a portion 600 of the updated flight tracking image 500 and transmit the captured flight tracking image 800 to the aircraft 120 for presentation on the onboard display device 122, as described above. In this regard, by virtue of the interactive monitoring process 900 described above, the pilot and the flight dispatcher may mutually agree on a modification to a portion of the original flight plan from SOSAL-JARMO-MADLO to SOSAL-HADLY-JARMO-MADLO to avoid traversing real-time convective regions 406 currently detected by the onboard detection system(s) 138 and also avoid traversing forecasted convective regions 306 identified by the external monitoring system(s) 116. In this manner, safer operation of the aircraft 120 may be achieved efficiently while improving the situational awareness of both the pilot (or other onboard personnel) and the ground personnel.

To briefly summarize, the subject matter described herein allows for the ground display device and the onboard display device to be effectively synchronized in terms of the displayed content, and in some embodiments, the display settings. Additionally, the displayed content corresponds to an amalgamation of information available at the ground location from one or more external sources, which may otherwise unavailable onboard the aircraft, with information from onboard detection system(s), which may otherwise be unavailable from the external sources or outside of the aircraft normally. For example, relatively accurate and/or precise real-time onboard weather data for a more limited geographic area around the aircraft may be integrated with relatively less accurate and/or less precise real-time and/or forecasted weather data for a relatively large geographic area encompassing an extended portion of the projected flight plan that was obtained from other sources. Thus, the situational awareness of both the ground personnel and the onboard personnel is improved by providing a more comprehensive view of the current conditions relating to upcoming operation of the aircraft. Moreover, by synchronizing the pilot's display with the ground personnel's display, the pilot and ground personnel may communicate more efficiently and/or effectively to achieve a mutual agreement with respect to the upcoming operation of the aircraft in a safe, efficient manner.

For the sake of brevity, conventional techniques related to graphics and image processing, image fusion, aircraft controls, monitoring systems, flight tracking, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The foregoing detailed description is merely exemplary in nature and is not intended to limit the subject matter of the application and uses thereof Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of monitoring an aircraft, the method comprising:
obtaining, by a processing system at a ground location, first information associated with a first region in a vicinity of the aircraft detected by a detection system onboard the aircraft;

obtaining, by the processing system, second information associated with a second region identified by an external system communicatively coupled to the processing system;

displaying, by the processing system on a display device at the ground location, a flight tracking image associated with the aircraft, the flight tracking image including a first graphical representation of the first region and a second graphical representation of the second region;

capturing at least a portion of the flight tracking image displayed on the display device, wherein the capturing results in a captured flight tracking image including the first graphical representation of the first region and the second graphical representation of the second region; and communicating the captured flight tracking image to the aircraft.

2. The method of claim 1, wherein:

capturing the flight tracking image comprises creating an image file corresponding to the flight tracking image displayed on the display device at a time of the capturing;

and communicating the captured flight tracking image comprises uploading the image file to the aircraft.

3. The method of claim 1, wherein:

obtaining the first information comprises obtaining information indicative of a real-time meteorological condition detected by the detection system onboard the aircraft;

obtaining the second information comprises obtaining information indicative of a forecasted meteorological condition; and the first graphical representation of the real-time meteorological condition and the second graphical representation of the forecasted meteorological condition are concurrently displayed on the flight tracking image.

4. The method of claim 1, wherein:

obtaining the first information comprises obtaining real-time meteorological information for the first region proximate the aircraft that is detected by the detection system onboard the aircraft;

obtaining the second information comprises obtaining meteorological information for the second region;

the second region has a geographic area greater than a geographic area associated with the first region; and the first graphical representation of the real-time meteorological information and the second graphical representation of the meteorological information are concurrently displayed on the flight tracking image.

5. The method of claim 1, further comprising transmitting, by the processing system, a request for the first information to the aircraft via a communications network, wherein:

obtaining the first information comprises receiving a response from the aircraft via the communications network; and the response includes the first information.

6. The method of claim 5, wherein:

capturing the flight tracking image comprises creating an image file corresponding to the flight tracking image displayed on the display device at a time of the capturing; and communicating the captured flight tracking image comprises:

initiating, by the processing system, a communications session with the aircraft via the communications network; and uploading the image file to the aircraft via the communications network within the communications session.

7. The method of claim 1, further comprising fusing the second graphical representation of the second region with a captured image to obtain the flight tracking image, wherein:

obtaining the first information comprises receiving the captured image from the aircraft;

the captured image corresponds to a state of a second display device onboard the aircraft; and the captured image includes the first graphical representation of the first region.

8. The method of claim 1, wherein displaying the flight tracking image comprises:

displaying, on the display device, a map including a graphical representation of the aircraft overlying a graphical representation of terrain;

displaying the first graphical representation of the first region on the map overlying the graphical representation of terrain; and displaying the second graphical representation of the second region on the map overlying the graphical representation of terrain.

9. The method of claim 8, further comprising:

receiving, by the processing system, user input indicative of a modified flight path configured to circumnavigate at least one of the first region and the second region; and displaying a graphical representation of the modified flight path on the map overlying the graphical representation of terrain, wherein the captured flight tracking image includes the modified flight path.

10. The method of claim 1, wherein:

capturing at least the portion of the flight tracking image comprises:

receiving, via a user input device coupled to the processing system, user input corresponding to selection of the portion of the flight tracking image;

generating a cropped portion of the flight tracking image corresponding to the selection, wherein the cropped portion is configured to fit a second display device onboard the aircraft; and creating an image file corresponding to the cropped portion; and communicating the captured flight tracking image comprises transmitting the image file to the aircraft.

11. The method of claim 1, wherein displaying the flight tracking image comprises the processing system displaying a map on the display device, wherein:

the map includes the first graphical representation of the first region and the second graphical representation of the second region displayed concurrently; and the captured flight tracking image includes the first graphical representation of the first region and the second graphical representation of the second region displayed concurrently.

12. A flight tracking station comprising:

a communications system coupled to a communications network to receive first information associated with a first region in a vicinity of an aircraft detected by a detection system onboard the aircraft;

a display device having a map associated with the aircraft presented thereon; and a processing system coupled to the communications system, the display device, and a monitoring system to:

display a first graphical representation of the first region on the map;

obtain second information associated with a second region identified by the monitoring system;

display a second graphical representation of the second region on the map; and capture at least a portion of the map, resulting in a captured flight tracking image including the first graphical representation of the first region and the second graphical representation of the second region, wherein the processing system and the communications system are cooperatively configured to transmit the captured flight tracking image to the aircraft via the communications network.

13. The flight tracking station of claim 12, wherein:

the first region comprises a real-time meteorological region detected by the detection system onboard the aircraft; and the second region comprises a forecasted meteorological region.

14. The flight tracking station of claim 12, wherein the captured flight tracking image comprises an image file corresponding to a displayed state of the map at an instant in time.

15. The flight tracking station of claim 14, further comprising an input device coupled to the processing system to receive indication of a desire to capture the map at the instant the indication is received.

16. The flight tracking station of claim 14, wherein the processing system and the communications system are cooperatively configured to upload the captured flight tracking image to the aircraft over the communications network in accordance with the Internet protocol (IP) suite.

17. An onboard system comprising:

a display device;

a detection system to provide first information indicative of a detected region in a vicinity;

a communications system coupled to a communications network; and a processing system coupled to the communications system, the display device, and the detection system to:

communicate the first information to a tracking station via the communications network;

receive a captured tracking image from the tracking station via the communications network, wherein the captured tracking image comprises at least a portion of a map including a first graphical representation of the detected region and a second graphical representation of a second region identified by a monitoring system communicatively coupled to the tracking station displayed concurrently thereon; and display the captured tracking image on the display device.

18. The system of claim 17, wherein:

the detected region comprises a real-time meteorological region; and the second region comprises a forecasted meteorological region.

19. The system of claim 17, further comprising an input device to receive user input indicative of a desire to capture a displayed state of the display device, wherein:

the processing system is coupled to the input device and configured to:

display the first graphical representation of the detected region on the display device;

capture the displayed state of the display device in response to the user input, resulting in a captured image including the first graphical representation; and communicate the captured image to the tracking station via the communications network.

20. The system of claim 19, wherein the captured tracking image comprises a fused image comprising the captured image and the second graphical representation.

* * * * *